US012305830B1

(12) United States Patent
Wang et al.

(10) Patent No.: US 12,305,830 B1
(45) Date of Patent: May 20, 2025

(54) CIRCUIT CARTRIDGE

(71) Applicant: Wangs Alliance Corporation, Port Washington, NY (US)

(72) Inventors: Qianxiang Wang, Great Neck, NY (US); Voravit Puvanakijjakorn, Port Washington, NY (US)

(73) Assignee: Wangs Alliance Corporation, Port Washington, NY (US)

( * ) Notice: Subject to any disclaimer, the term of this patent is extended or adjusted under 35 U.S.C. 154(b) by 0 days.

(21) Appl. No.: 19/010,533

(22) Filed: Jan. 6, 2025

Related U.S. Application Data

(60) Provisional application No. 63/705,842, filed on Oct. 10, 2024.

(51) Int. Cl.

| | |
|---|---|
| ***F21V 17/06*** | (2006.01) |
| ***F21V 23/00*** | (2015.01) |
| ***F21V 23/04*** | (2006.01) |
| ***F21V 23/06*** | (2006.01) |
| *F21V 21/04* | (2006.01) |

(52) U.S. Cl.
CPC ............ *F21V 17/06* (2013.01); *F21V 23/008* (2013.01); *F21V 23/0435* (2013.01); *F21V 23/06* (2013.01); *F21V 21/045* (2013.01)

(58) Field of Classification Search
CPC .... F21V 17/06; F21V 23/008; F21V 23/0435; F21V 23/06; F21V 21/045
See application file for complete search history.

(56) References Cited

U.S. PATENT DOCUMENTS

| | | | | |
|---|---|---|---|---|
| 9,506,611 | B2 | 11/2016 | Ramirez | |
| 11,156,343 | B1 * | 10/2021 | Kloepple | F21V 5/00 |
| 2008/0232116 | A1 * | 9/2008 | Kim | F21V 29/83 362/365 |
| 2019/0226667 | A1 * | 7/2019 | Dietrich | B60Q 3/76 |
| 2020/0041106 | A1 * | 2/2020 | Ninomiya | F21V 21/03 |
| 2023/0315169 | A1 * | 10/2023 | Zhou | H05K 7/1407 361/679.32 |

* cited by examiner

*Primary Examiner* — Evan P Dzierzynski
(74) *Attorney, Agent, or Firm* — Weiss & Arons LLP

(57) ABSTRACT

Apparatus for a mounting adapter may include a first releasable catch and a second releasable catch. The first releasable catch may prevent movement along a first direction and the second releasable catch may prevent movement along a second direction that is opposite the first direction. The mounting adapter may include a payload support configured to support a payload. The first releasable catch and the second releasable catch may be configured to releasably fix the payload support relative to a mounting hole after the mounting adapter is inserted along the second direction into the mounting hole. The first releasable catch and the second releasable catch may be configured to releasably fix the payload support relative to the mounting hole after the mounting adapter is inserted along the first direction into the mounting hole.

30 Claims, 21 Drawing Sheets

CIRCUIT CARTRIDGE

CROSS-REFERENCE TO RELATED APPLICATIONS

This is a nonprovisional of U.S. Provisional Application No. 63/705,842, filed on Oct. 10, 2024, which is hereby incorporated herein by reference in its entirety.

BACKGROUND

A fixture may be installed in or behind an architectural structure. The structure may include a wall. The structure may include a ceiling. The fixture may be enclosed in the architectural structure. The fixture may include or be housed in a housing. The fixture may include accessories. The fixture may be an accessory. Without demolishing, in part or in whole, the architectural structure, the fixture may be accessible to a user only through an opening in the architectural structure or housing. The opening may correspond to a location in which light from a light source in the fixture may emerge into an architectural space that is to be illuminated by the fixture. The fixture and accessories thereto may thus be difficult to service or replace.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
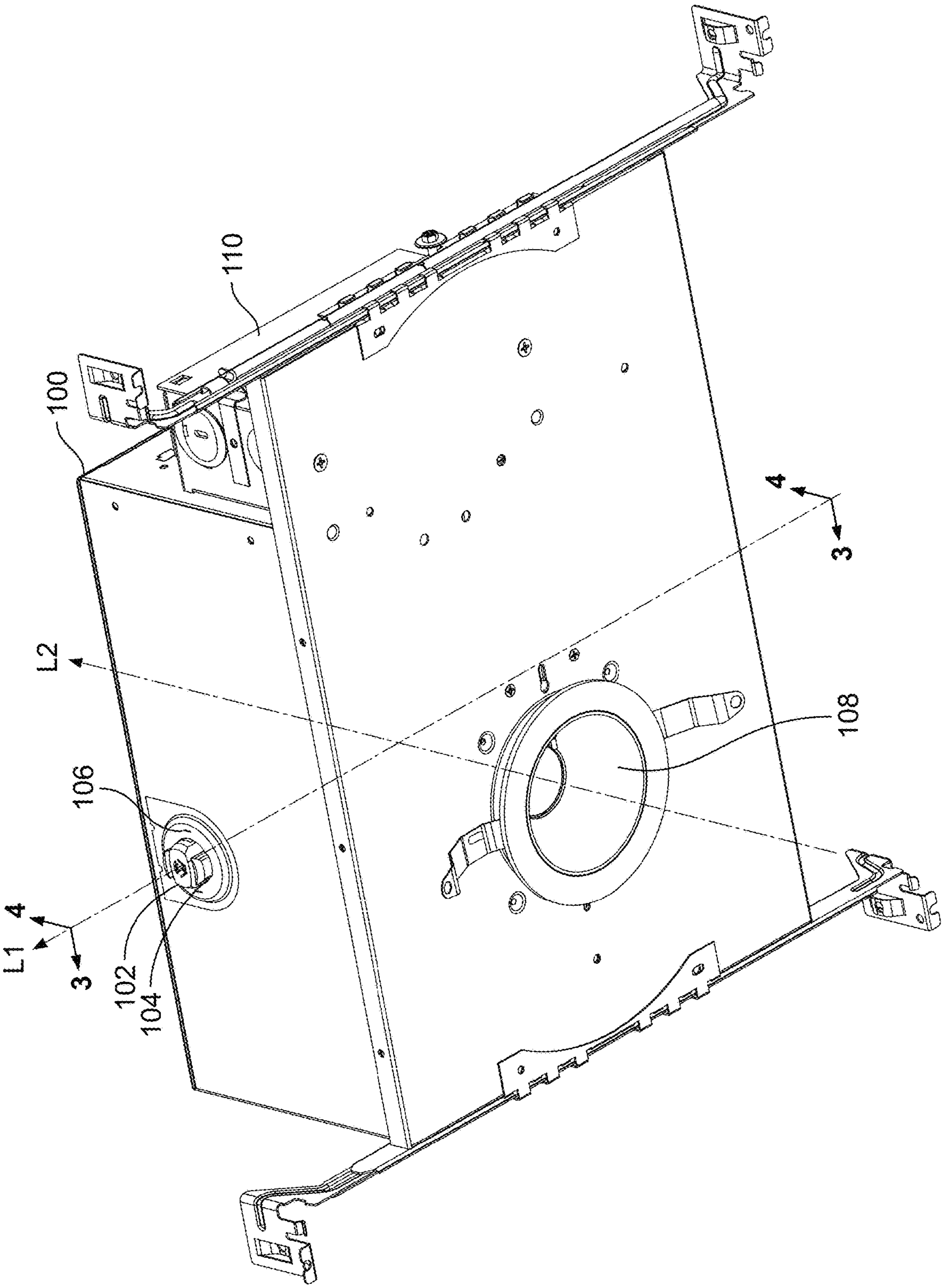
FIG. 1 shows schematically illustrative apparatus in accordance with the principles of the invention.

Apparatus and methods for mounting a payload are provided. Apparatus may include a mounting adapter. The mounting adapter may facilitate mounting of the payload in a mounting hole. The mounting hole may be in a fixture housing. The fixture housing may be configured for installation in or behind an architectural structure. The mounting hole may be in a mounting structure. The mounting structure may include a bracket. The mounting structure may be independent of a fixture housing. The mounting structure may be configured to be mounted in a fixture housing. The mounting structure may be mounted in the fixture housing such that the mounting hole in the mounting structure is aligned with, sits within, or extends through an orifice in the fixture housing. The payload may thereby extend wholly or partially exterior to the fixture housing. The mounting structure may be configured to facilitate its removal, along with the mounting adapter and payload, from the fixture housing without removal of the fixture housing from the architectural structure and without modification of the fixture housing or architectural structure.

Details relating to the mounting structure and its interaction with the mounting adapter are described in commonly assigned U.S. patent application Ser. No. 19/010,610 entitled ACCESSIBLE MOUNTING STRUCTURE, filed on even date herewith, which is hereby incorporated by reference herein in its entirety.

The mounting adapter may include a first releasable catch. The first releasable catch may define a first direction (the "first catch-direction"). The first catch-direction may point towards an interior of the fixture housing or mounting structure in which the mounting adapter may be inserted. The first releasable catch may be configured to prevent movement along the first catch-direction.

The mounting adapter may include a second releasable catch. The second releasable catch may define a second direction (the "second catch-direction"). The second catch-direction may be opposite the first catch-direction and may point towards an exterior of the fixture housing or mounting structure in which the mounting adapter may be inserted. The second releasable catch may be configured to prevent movement along the second catch-direction. When the mounting adapter is inserted in the mounting hole along an axis that is colinear with the first and second catch-directions, the first and second releasable catches may together prevent movement both ways along the axis and fix the mounting adapter in place.

The mounting adapter may include a payload support. The payload support may be configured to support a payload. The payload may include one or more fixture devices, such as a light, fan, speaker, heating element or other climate control device, communication device, or any suitable fixture that may be installed in a fixture housing or architectural structure. The payload may include one or more accessories to a fixture device, such as an antenna or other apparatus for supporting wired or wireless communication, apparatus for conveying or controlling electric power, apparatus for controlling the fixture device, status indicators, or any suitable accessory that may be installed in a fixture housing or otherwise proximal to a fixture device.

The first releasable catch and the second releasable catch may be configured to releasably fix the payload support relative to the mounting hole after the mounting adapter is inserted along the second catch-direction into the mounting hole. This may correspond to insertion of the mounting adapter into the mounting hole from an interior of the fixture housing or mounting structure. The first releasable catch and the second releasable catch may be configured to releasably fix the payload support relative to the mounting hole after the mounting adapter is inserted along the first catch-direction into the mounting hole. This may correspond to insertion of the mounting adapter into the mounting hole from an exterior of the fixture housing or mounting structure. Releasably fixing the payload support relative to the mounting hole may also include releasably fixing the mounting adapter. Releasably fixing the payload support relative to the mounting hole may also fix the payload that is supported by the payload support.

The first releasable catch may include a first hinged end. The first releasable catch may include a first free end. The second releasable catch may include a second hinged end. The second releasable catch may include a second free end.

The first free end may be disposed, relative to the first hinged end, in the second catch-direction. The second free end may be disposed, relative to the second hinged end, in the second catch-direction. The first free end may be disposed further along the second catch-direction relative to the second free end.

The mounting adapter may include a shell. The payload support may be configured to support the payload in the shell. The shell may define a window. The window may be configured to receive the second releasable catch when the second releasable catch is in a deflected state. A deflected state may include a depressed or non-extended state, or a state in which the catch is pressed toward a central axis of the mounting adapter. Receiving the second releasable catch in the window when the second releasable catch is in a deflected state may create a reduced perimeter cross section of the mounting adapter which may facilitate insertion of the mounting adapter into the mounting hole.

The first releasable catch may extend from an exterior of the shell. The first releasable catch may include a free end that is, when the first releasable catch is in a relaxed state, spaced apart from the exterior of the shell. There may be a clearance gap between the free end of the first releasable catch and the exterior of the shell.

The first releasable catch may be one of two diametrically opposed first releasable catches. The second releasable catch may be one of two diametrically opposed second releasable catches. The four releasable catches (i.e., the two diametrically opposed first releasable catches and the two diametrically opposed second releasable catches) may be spaced ninety degrees apart from each other about the mounting adapter.

Details disclosed with respect to one feature (e.g., one first releasable catch) may apply equally to another one of the same feature (e.g., a diametrically opposed first releasable catch). Similarly, any feature disclosed as part of the mounting adapter or other apparatus may, in certain embodiments, be duplicated with diametrically opposed, or otherwise suitably positioned, duplicate features.

The first releasable catch may be one of two or more first releasable catches, each configured to prevent movement in the first catch-direction. The second releasable catch may be one of two or more second releasable catches, each configured to prevent movement in the second catch-direction. The releasable catches may be spaced evenly about the mounting adapter. The releasable catches may alternate between first and second releasable catches.

The first releasable catch may include a detent that is configured to prevent movement, relative to the mounting hole, of the first releasable catch in the first catch-direction. The first releasable catch may include a biased arm that supports the detent and is biased away from a central axis of the mounting adapter. The central axis may be parallel to the first and second catch-directions. The central axis may be collinear with the first and second catch-directions. The detent may include a surface whose face is perpendicular or substantially perpendicular (i.e., perpendicular as viewed by the naked eye, or close to perpendicular, such as within 1,3, 5, 10, or 20 degrees of perpendicular) to the central axis. The face may be transverse to the central axis. The face may be oblique to the central axis. The face may be configured, in operation, to engage a perimeter of the mounting hole (e.g., an exterior of the fixture housing or mounting structure) when the first releasable catch is extended away from the central axis, thereby preventing movement of the mounting adapter in the first catch-direction relative to the mounting hole. When the first releasable catch is deflected, the face may fit within the mounting hole and may no longer engage the perimeter.

The second releasable catch may include a detent that is configured to prevent movement, relative to the mounting hole, of the second releasable catch in the second catch-direction. The second releasable catch may include a biased arm that supports the detent and is biased away from a central axis of the mounting adapter. The detent may include a surface whose face is perpendicular or substantially perpendicular to the central axis. The face may be transverse to the central axis. The face may be oblique to the central axis. The face may be configured, in operation, to engage a perimeter of the mounting hole (e.g., an interior of the fixture housing or mounting structure) when the second releasable catch is extended away from the central axis, thereby preventing movement of the mounting adapter in the second catch-direction relative to the mounting hole. When the second releasable catch is deflected, the face may fit within the mounting hole and may no longer engage the perimeter.

The mounting adapter may include a first base that supports the first releasable catch. The mounting adapter may include a second base that supports the second releasable catch. The first and second bases may be unified to form the frame of the mounting adapter. The first and second bases may be formed as two separate pieces. The first and second bases may be configured to slide into or otherwise engage each other to be unified. The first and second bases may be permanently attached to each other to be unified. The unified first and second bases may be of monolithic construction.

The mounting adapter may include a shell. The shell may be part of the first base. The shell may extend from an outer cap of the first base. The shell may be configured to receive the second base.

In operation the first base and the second base may form a frame in which the payload support is configured to hold the payload. The frame may include the shell. The frame may define windows. The windows may be defined in the shell. The windows may facilitate clearance of the second releasable catch. The windows may receive a hinged end of the second releasable catch when the second base is inserted into the first base. The windows may leave room for a free end of the second releasable catch to be received therein when the second releasable catch is deflected.

The first base may support the first releasable catch via a first biased hinge. The second base may support the second releasable catch via a second biased hinge.

The first biased hinge may include a first flexural hinge. The second biased hinge may include a second flexural hinge.

The first releasable catch may include a first free end that is configured to move by flexion of the first flexural hinge. The second releasable catch may include a second free end that is configured to move by flexion of the second flexural hinge. The first and second free ends may include detents configured to prevent movement relative to the mounting hole.

The payload support may include notches, tabs, or other suitable receptacles. The payload support may be disposed in the first base. The payload support may include notches defined by the first base. The payload support may be disposed in the second base. The payload support may include notches defined by the second base. The payload may be attached to or monolithic with one of the bases and may be supported by a payload support on the other base. The first and second bases together may define the payload support. The payload support may include notches, tabs, or other suitable receptacles defined by the first base and by the second base. The receptacles may lie on the same plane and may face each other when the first and second bases are unified. The payload may be supported by the payload support when the first and second bases are unified around the payload. The payload may be inserted into the mounting adapter after the first and second bases are unified. The payload may slide into the mounting adapter through a window, hatch, cap, lid, or other suitable entry point in a side or end of the mounting adapter. The payload may be supported in the mounting adapter in any suitable manner for supporting a payload in a mounting apparatus.

The payload may include an antenna. The payload may include a receiver chip. The payload may include a transmitter chip. The payload may include a microcontroller. The payload may include a transceiver chip. Transceivers may, for example, be used in radio frequency (RF) communication systems, for transmitting data over fiber optic cables, or for connecting devices in an Ethernet network. Illustrative transceiver chips include Semtech's SX127x, SX126x, and LLCC68 LoRa chips for low-power wireless communication, Hittite Microwave Corp.'s HMC6000/6001 chipset for millimeter wave frequencies, and various optical transceiver chips like SFP, SFP+, QSFP, and GBIC used in fiber optic networks.

The payload may include one or more circuits. The payload may include one or more components associated with a fixture or fixture accessory. Table 1 includes a list of illustrative components. Component locations may correspond to locations in a circuit diagram substantially similar to the one shown in FIG. 21.

TABLE 1

| Material description | Component Location |
|---|---|
| 7EPE411825 Double-sided FR-4 28 * 17 * 1.2 mm | |
| Bluetooth module LH-BM62CA-V1 | U1 |
| 1/16W chip resistor, 0R ± 1% (0402) | R4, R5, R10, R12 |

TABLE 1-continued

| Material description | Component Location |
|---|---|
| 1/16W chip resistor, 100R ± 1% (0402) | R14, R15 |
| 1/16W chip resistor, 4.7K ± 1% (0402) | R11, R13 |
| X7R chip capacitor 10UF/25V ±20% 125° C. (0805) | C1 |
| X7R chip capacitor luF/50V, ±10%, 125° C. (0805) | C2 |
| X7R chip capacitor 100nF/50V, ±10%, 125° C. (0805) | C3 |
| Everlight side-mounted indicator light 12-22-R6G6C-C30-2C RG | LED1, LED2 |
| 1/10W chip resistor, 100R ± 1% (0603) | R7, R8 |
| LD3070U2542EP0700 DONGLE patch component | |
| UL2517 four-core black sheathed cable with 4P2.0 male end/RJ11 crystal head 350 mm | |
| 4PIN female terminal 10 * 5 * 3 mm | |
| Bluetooth module body black | |
| Bluetooth module base black | |
| Dongle90 degree diffusion film | |

The mounting adapter may define a central axis. The first releasable catch may have a first surface that is configured to prevent movement, relative to the mounting hole, of the first releasable catch in the first catch-direction. The second releasable catch may have a second surface that is configured to prevent movement, relative to the mounting hole, of the second releasable catch in the second catch-direction. The first and second surfaces may define an offset between them. The offset may correspond to a space where a panel, plate, or wall of a fixture housing or mounting structure (in which the mounting hole is disposed or in which the mounting adapter may otherwise be installed) may be clamped or straddled by the first and second surfaces, thereby holding the mounting adapter in place along the central axis.

The payload support may be configured to position the payload so that, along the direction of the central axis, the offset overlaps the payload. The payload support may be configured to position the payload so that, along the direction of the central axis, the offset does not overlap the payload.

The payload may include a payload mount and payload componentry. The payload mount may include a board, frame, or other suitable hardware configured to be supported by the payload support and to support the payload componentry. The payload mount may include a circuit board. The payload componentry may include circuitry or other functional components of the payload.

The payload support may be configured to position the payload so that, along the direction of the central axis, the offset overlaps the payload componentry. The payload support may be configured to position the payload so that, along the direction of the central axis, the offset does not overlap the payload componentry. Some or all of the payload componentry may be positioned away from the offset in the first catch-direction. Some or all of the payload componentry may be positioned away from the offset in the second catch-direction. For example, it may be advantageous for a particular portion of the payload componentry to be positioned away from the offset in the second catch-direction. The particular portion of the payload componentry may, for example, include an antenna, light indicator, or other component that is advantageous to be positioned exterior the housing for improved wireless connectivity or visibility.

For example, the mounting hole may be in a fixture housing panel. In certain embodiments, the mounting hole may be in a mounting structure that is then installed in the fixture housing panel. The mounting adapter may extend from a first location interior the housing to a second location exterior the housing. The payload may be partially interior and partially exterior the housing. The payload may be entirely interior the housing. The payload may be entirely exterior the housing. The payload may be partially interior and partially exterior the housing. The payload componentry, or a particular portion thereof, may be entirely exterior the housing. The payload componentry, or a particular portion thereof, may be entirely interior the housing.

Illustrative embodiments of apparatus and methods in accordance with the principles of the invention will now be described with reference to FIGS. 1-21, which form a part hereof. It is to be understood that other embodiments may be utilized and that structural, functional and procedural modifications or omissions may be made without departing from the scope and spirit of the present invention.

The leftmost digit of a three-digit reference numeral (e.g., "1" of "102"), and the two leftmost digits of a four-digit reference numeral (e.g., "11" of "1102"), generally identify the first figure in which a part is called-out.

FIG. 1 shows an illustrative apparatus in accordance with the principles of the invention. Mounting adapter 102 may operate in a system that includes mounting structure 106.

Mounting adapter 102 may be mounted in a mounting hole in mounting structure 106. Mounting structure 106 may be installed in housing 100. Housing 100 may house fixture 108 in an aperture of housing 100. Fixture 108 may include a light. Fixture 108 may include a fan or any other suitable fixture. Housing 100 may be configured for installation in or behind an architectural structure such as a ceiling or a wall. The architectural structure may include a floor. The architectural structure may be a vehicle.

Mounting structure 106 may include a plate, a housing, a panel or any other suitable structure. Mounting structure 106 may be configured to be releasably mounted in housing 100. Mounting structure 106 may be configured to be releasably mounted in an orifice of housing 100, and may extend out of housing 100 (as shown in FIG. 1). Mounting adapter 102 may extend even further than mounting structure 106 out of housing 100. Mounting structure 106 may be configured to be installed into and removed from housing 100 via the aperture of housing 100 which may receive fixture 108. Mounting adapter 102 may remain mounted to mounting structure 106 even when mounting structure 106 is so removed.

Mounting adapter 102 may include a cartridge-like form. Mounting adapter 102 may include a main body (which may be referred to elsewhere herein as a "first base" or "shell"). Mounting adapter 102 may include a core (which may be referred to elsewhere herein as a "second base"). Mounting adapter 102 may include a circuit board. The main body may receive the circuit board and the core. The core may be engageable with the main body.

Mounting adapter 102 may include one or more catches, including outer catch 104. The main body may include one or more of the catches. The core may include one or more of the catches. The catches may engage mounting structure 106. The catches may operate together to retain mounting adapter 102 in a position relative to mounting structure 106. The position may be in a hole in the mounting structure.

Mounting adapter 102 may include plastic. Mounting adapter 102 may include metal, such as steel or aluminum. Mounting adapter 102 may include any suitable material.

Mounting adapter 102 may include a payload that may include circuitry. The circuitry may include an antenna. The circuitry may include one or more receivers. The circuitry may include one or more transmitters. The one or more receivers or transmitters may be configured to communicate via a suitable communication protocol. The communication protocol may be a wired communication protocol. The communication protocol may be a wireless communication protocol. The wireless communication protocol may be a WiFi protocol. The wireless communication protocol may be a Bluetooth protocol. The Bluetooth protocol may be a Bluetooth Mesh protocol. The wireless communication protocol may be a radio frequency ("RF") protocol. The wireless communication protocol may include any suitable wireless communication protocol.

The communication protocol may include a power line communication protocol. The communication protocol may include a digital multiplex (DMX) protocol. The communication protocol may include any suitable wired communication protocol.

The circuitry may include a fixture control circuit. The fixture control circuit may be configured to control one or more fixtures. The fixtures may include one or more fans. The fixtures may include one or more LED light sources. The fixtures may include any other suitable fixture components.

The system may include a port. The port may receive operational power for fixture 108. The port may be configured to receive control information for fixture 108. The port may be included in mounting adapter 102.

Mounting adapter 102 may be configured to be inserted through a hole in mounting structure 106. Mounting adapter 102 may be configured to removably engage mounting structure 106. Mounting adapter 102 may be configured to permanently engage mounting structure 106. Mounting adapter 102 may have outer catches (including outer catch 104) that engage an outer surface of mounting structure 106. Mounting adapter 102 may have inner catches (not visible in FIG. 1) that engage an inner surface of mounting structure 106. Mounting structure 106 may be a mounting structure that does not include a feature that is configured to interact with mounting adapter 102 other than mounting structure 106 itself and the hole therein. Mounting structure 106 may be configured to be received in housing 100. Mounting structure 106 may be configured to be installed in an orifice of housing 100, and mounting adapter 102 may extend through the orifice and sit entirely or partially exterior to housing 100. In some embodiments, mounting adapter 102 may be configured to engage directly with housing 100. Mounting adapter 102 may be configured to engage directly in an orifice of housing 100.

Mounting adapter 102 may be configured to be serviced when housing 100 is installed in a structure. The structure may include a wall, ceiling, roof or any other suitable structure. Mounting adapter 102 may be configured to be serviced without removal of housing 100 from the structure or otherwise causing damage to the structure.

Mounting adapter 102 may be configured to be inserted from a first side of mounting structure 106. Mounting adapter 102 may be configured to be inserted from a second side of mounting structure 106.

When mounting adapter 102 is inserted into mounting structure 106 from the interior of mounting structure 106 (corresponding to the inside of housing 100 when mounting structure 106 is installed in housing 100), the outer catches (including outer catch 104) may be deflected toward axis L1 to reduce the overall radius of mounting adapter 102. In the reduced configuration, mounting adapter 102 may be inserted into the hole. The outer catches (including outer catch 104), after passage through the hole, may spring back to their normal position and engage an outer surface of mounting structure 106. The outer catches may thereby provide resistance to passage of mounting adapter 102 in the −L1 direction relative to mounting structure 106. The outer catches may be referred to elsewhere herein as first releasable catches, and the −L1 direction, as the first catch-direction. The L1 axis line may be referred to elsewhere herein as a central axis of mounting adapter 102.

The inner catches (not visible in FIG. 1) may be configured to provide resistance to passage of mounting adapter 102 in the L1 direction relative to mounting structure 106. The inner catches may deflect away from L1 and provide pressure against an inner surface of mounting structure 106 in the L1 direction. The outer catches may be passed through the hole despite the resistance because the outer catches may be disposed in mounting adapter 102 further along the L1 direction than the inner catches are disposed in mounting adapter 102. When the outer catches are released on the outside side of the mounting structure, the inner catches may draw the outer catches against mounting structure 106. This may maintain a force against mounting structure 106 from both the outer catches (Fr (reactive), shown in FIG. 3) and the inner catches (Fa (active), shown in FIG. 4). The inner catches may be referred to elsewhere herein as second releasable catches, and the L1 direction, as the second catch-direction.

When mounting adapter 102 is inserted from the outside of mounting structure 106 (corresponding to the outside of housing 100 when mounting structure 106 is installed in housing 100), the inner catches (not shown in FIG. 1) may be deflected toward axis L1 to reduce the overall radius of mounting adapter 102. In the reduced configuration, mounting adapter 102 may be inserted into the hole. The inner catches, after passage through the hole, may spring back to their normal position. The outer catches may be configured to provide resistance to passage of mounting adapter 102 in the −L1 direction. When the inner catches are released on the interior side of mounting structure 106, the outer catches may draw the inner catches against mounting structure 106. The inner catches may then provide resistance to passage of mounting adapter 102 in the L1 direction. This may maintain a force against mounting structure 106 from both the outer catches (Fr, shown in FIG. 3) and the inner catches (Fa, shown in FIG. 4). In this scenario Force Fr may be active and Fa may be reactive. In some scenarios (e.g., when mounting adapter 102 is installed in mounting structure 106) Forces Fa and Fr may both maintain mounting adapter 102 in place, and may both be active or reactive. In some scenarios (e.g., when the inner catches are deflected and the outer catches are extended), only the outer catches may exert an active force. In some scenarios (e.g., when the outer catches are deflected and the inner catches are extended), only the inner catches may exert an active force. When both the inner and outer catches are extended, they may both exert active force.

Junction box 110 may contain system wiring and or other electrical components. Junction box 110 may, for example, facilitate connection of fixture 108 to building line power (e.g., 110-120V AC or 220-240V AC power).

Figure 2:
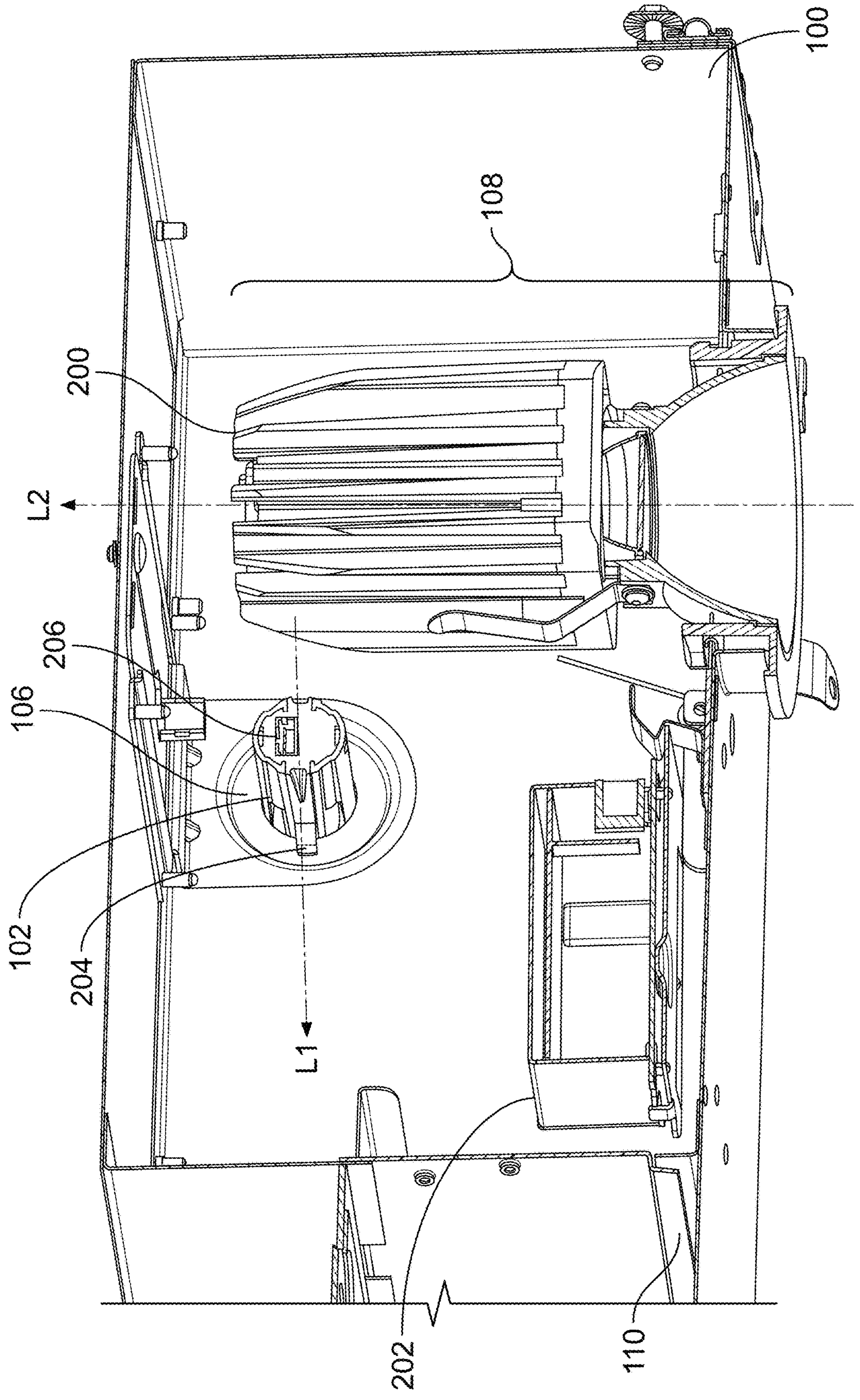
FIG. 2 shows schematically illustrative apparatus in accordance with the principles of the invention.

FIG. 2 shows mounting adapter 102 extending inside housing 100. The inner catches (including inner catch 204) may resist motion in the L1 direction. FIG. 2 also shows heat sink 200 which may be part of or be attached to fixture 108 and circuit box 202 which may contain system wiring and or other electrical components. FIG. 2 also shows power/comm port 206 which may provide a port for electrical communication between a payload of mounting adapter 102 and other parts of the system, such as fixture 108. Power/comm port 206 may connect with a wire to fixture 108. In some embodiments, mounting adapter 102 may connect wirelessly to fixture 108.

Figure 3:
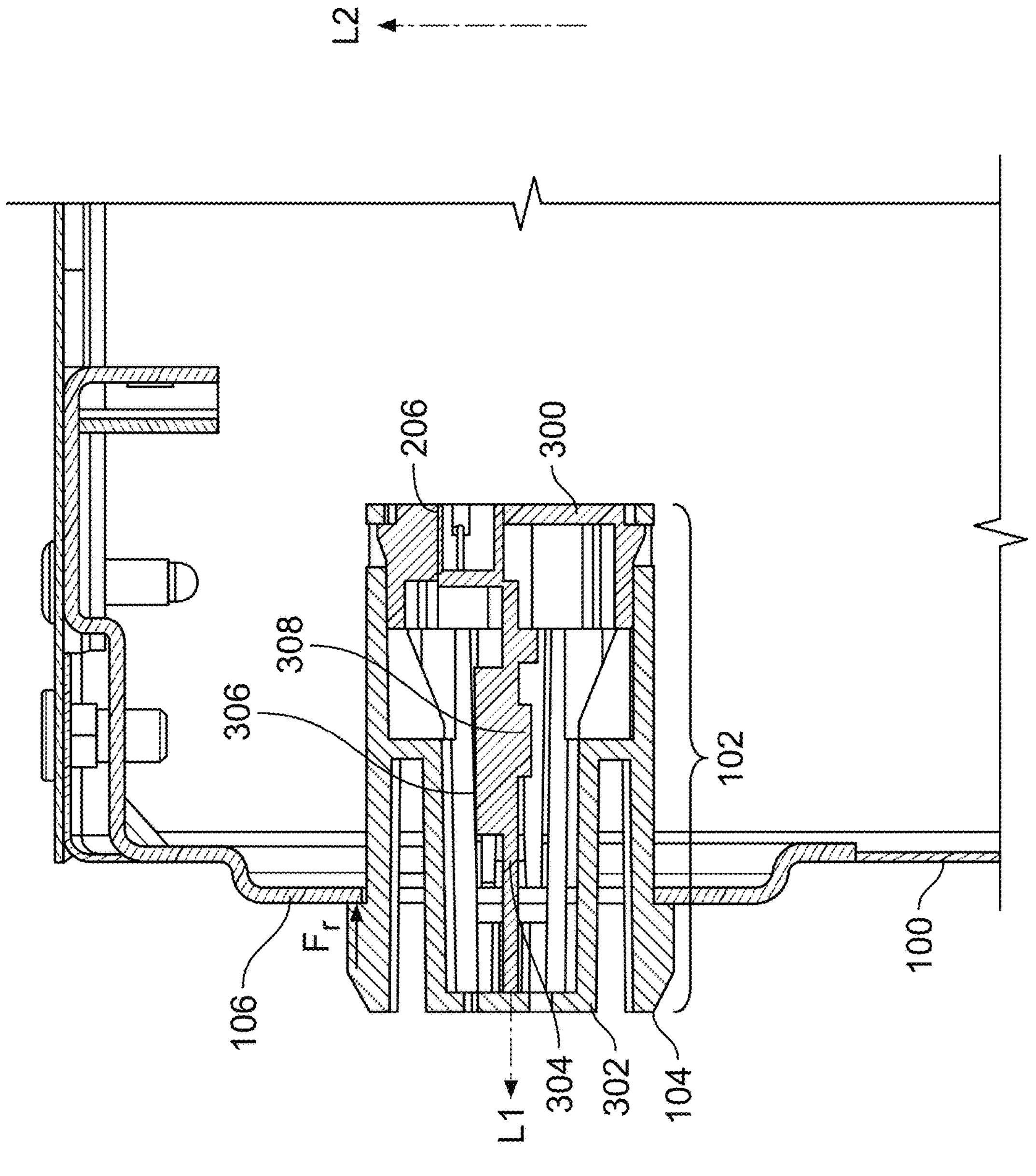
FIG. 3 is a partial cross-section taken along view lines 3-3 (shown in FIG. 1).

FIG. 3 shows a vertical cross-section of mounting adapter 102. Mounting adapter 102 may include main body 302 (this may be referred to elsewhere herein as the "first base" which may include the "shell"). Mounting adapter 102 may include core 300 (this may be referred to elsewhere herein as the "second base"). Core 300 may mate with main body 302. Main body 302 and core 300 may retain a payload such as circuit board 304. Circuit board 304 may include circuitry components 306 and 308. Circuitry component 306 may include a chip. Circuitry component 306 may include a micro processing unit (MCU). Circuitry component 308 may, for example, include an LED light. The outer catches (including outer catch 104 and another diametrically opposed outer catch) may be retained against mounting structure 106 and may thereby prevent motion of mounting adapter 102 in the −L1 direction relative to mounting structure 106.

Figure 4:
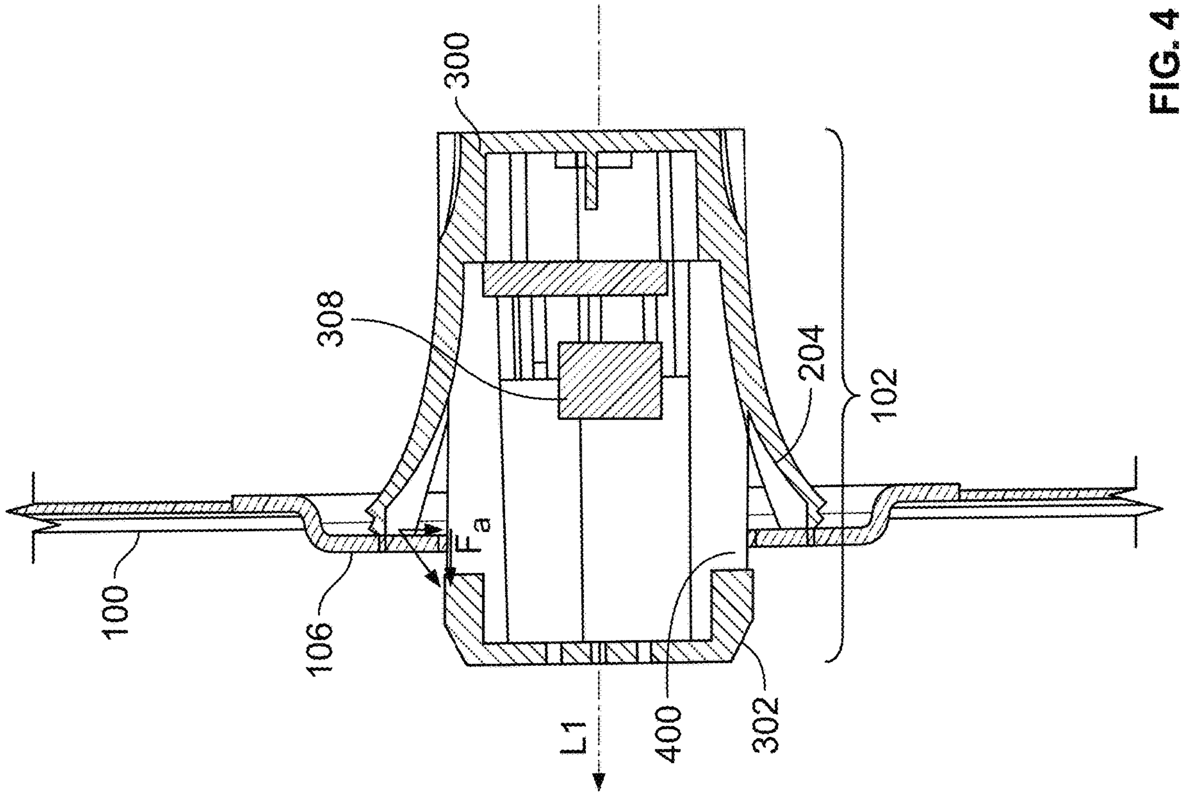
FIG. 4 is a partial cross-section taken along view lines 4-4 (shown in FIG. 1).

FIG. 4 shows a horizontal cross-section of mounting adapter 102. The inner catches (including inner catch 204 and another diametrically opposed inner catch) may be biased away from L1 and press against an inner surface of mounting structure 106. The inner catches may thereby resist movement of mounting adapter 102 in direction L1 relative to mounting structure 106. The outer catches (not visible in this cross-section) may resist movement of mounting adapter 102 in the −L1 direction relative to mounting structure 106. Main body 302 may define slot 400 (otherwise referred to herein as a "window") configured to receive inner catch 204.

Figure 5:
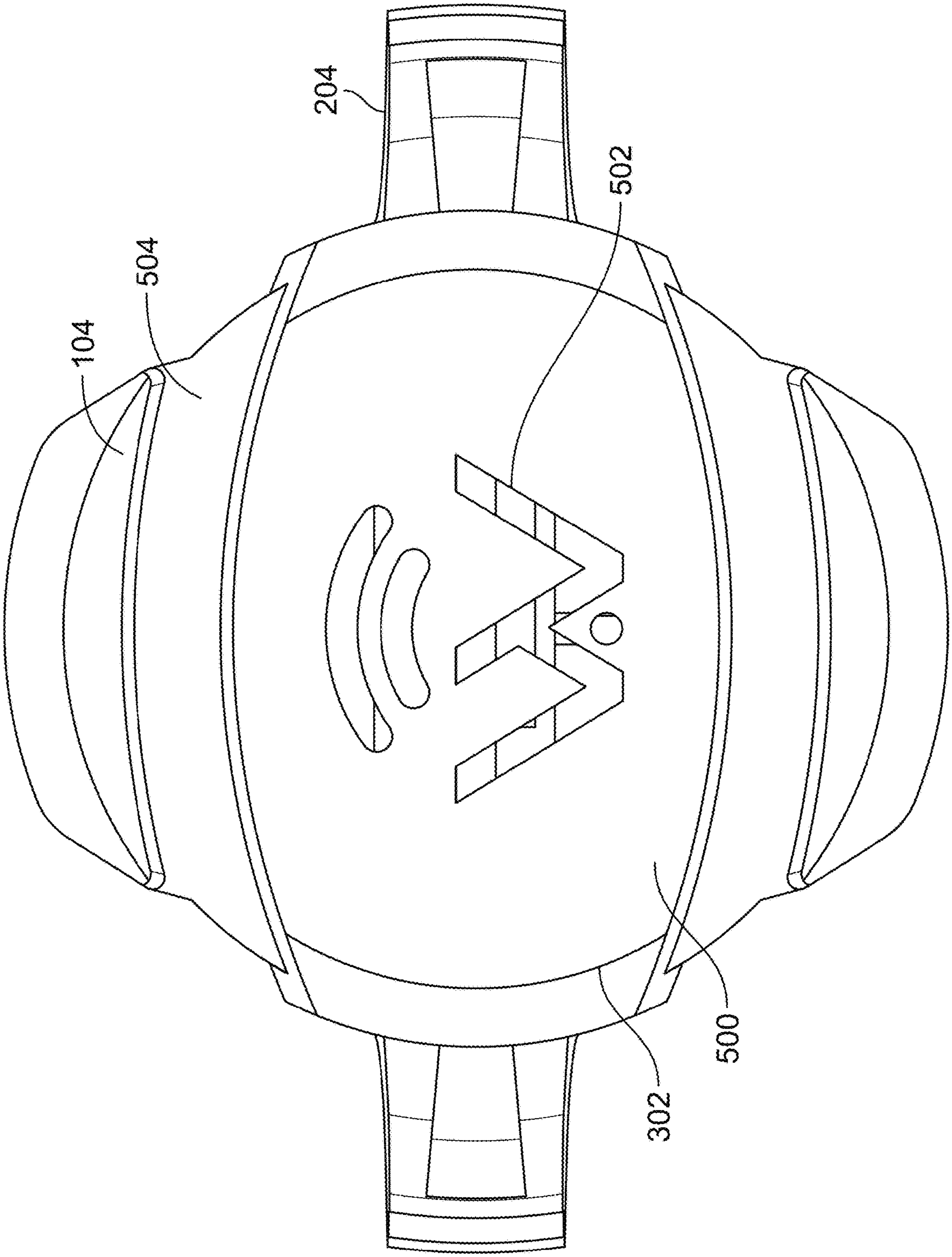
FIG. 5 shows schematically illustrative apparatus in accordance with the principles of the invention.

FIG. 5 shows mounting adapter 102 in a view taken along the −L1 direction (i.e., facing an outward facing face 500—which may be an outer face of an outer cap portion of the first base—of mounting adapter 102). Clearance gap 504 may allow outer catch 104 to bend relative to the rest of main body 302.

Main body 302 may include outward facing face 500. Outward facing face 500 may include indicator light window 502. Indicator light window 502 may include one or more perforations through outward facing face 500. The perforations may be configured to form a message such as a logo or source identifier. A light source inside mounting adapter 102 may indicate a status of mounting adapter 102. The light source may be installed on circuit board 304. The light source may be an LED light source. The light source may be any suitable light source. Light emitted from the light source may pass through indicator light window 502. The status may be indicated by a condition of the light source. The condition may be an ON/OFF condition, a color condition, a flashing condition, or any other suitable condition.

An illustrative mapping between a set of indicator light actions and a set of statuses is set forth below in Table 2. Such a mapping may relate to an outward facing indicator such as via indicator light window 502, or to any other suitable indicator light in the system (e.g., an inward facing indicator light). The status may relate to connectivity of the fixture or mounting adapter 102 to a network, such as a Bluetooth or Wifi network. The network may be a mesh network.

TABLE 2

| Status | Mesh tag Indicator Action |
|---|---|
| Paired to Mesh | GREEN: Solid on up to 2 minutes |
| Not paired to Mesh | RED: Solid red up to 2 minutes |
| Waiting for pairing | RED: Single flash up to 10 minutes |
| Fixture update in progress | GREEN: Double flash (duration of update) |
| Device Error | RED: Double Flash (continuously) |

Figure 6:
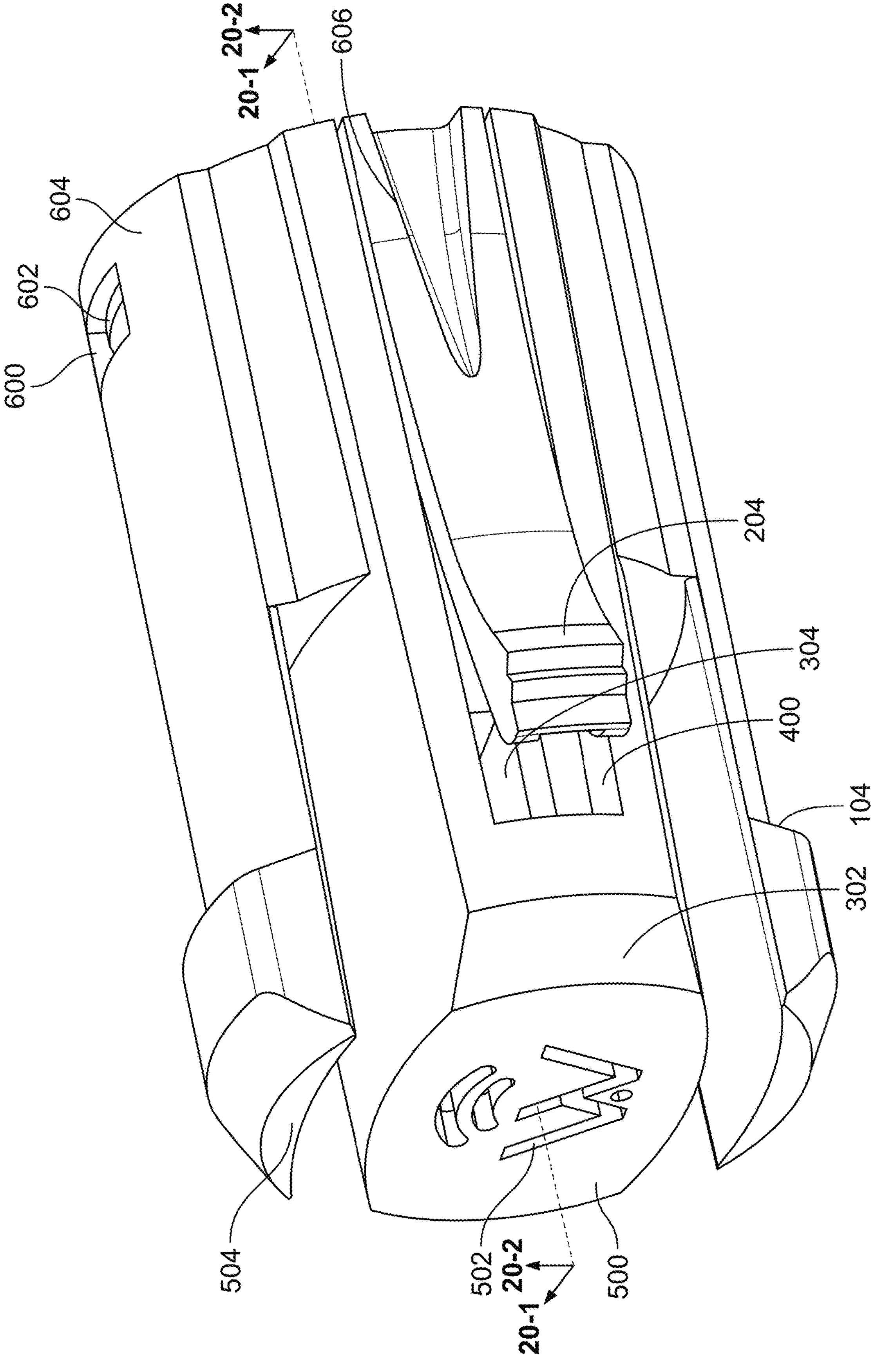
FIG. 6 shows schematically illustrative apparatus in accordance with the principles of the invention.

FIG. 6 shows that slot 400 may provide clearance for flexion of an inner catch (including inner catch 204). A stress relief cut-out or recess 606 may reduce cross-sectional area of the inner catch. Recess 606 may increase the bendability of the inner catch.

Main body 302 may include notch 600. Core 300 may include tab 602. Tab 602 may be biased to insert into notch 600 to retain core 300 in main body 302. Main body 302 may include split barrel 604. A duplicate notch and tab may be included diametrically opposed to notch 600 and tab 602.

Split barrel 604 may receive core 300. An outer catch may extend from split barrel 604. Split barrel 604 may include notch 600. Split barrel 604 may be biased to accommodate reception of tab 602 by notch 600.

The outer and inner catches (104 and 204, respectively) are illustrated in a non-deflected, normal, extended, or relaxed state.

Figure 7:
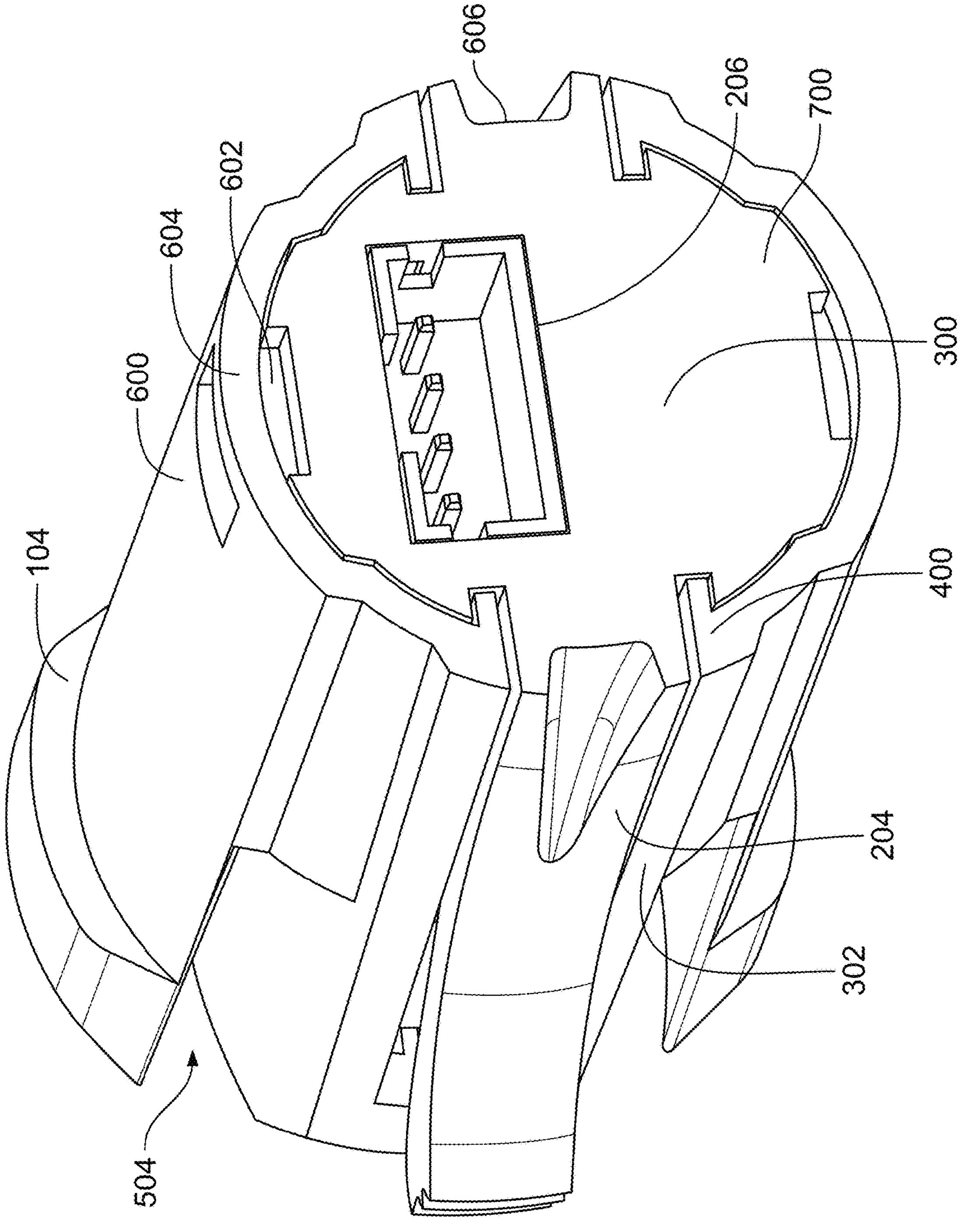
FIG. 7 shows schematically illustrative apparatus in accordance with the principles of the invention.

FIG. 7 shows mounting adapter 102. Core 300 may include an inward facing face 700. Inward facing face 700 may include an indicator light window (not shown). The window may have one or more features in common with indicator light window 502 shown and described in connection with the main body.

Figure 8:
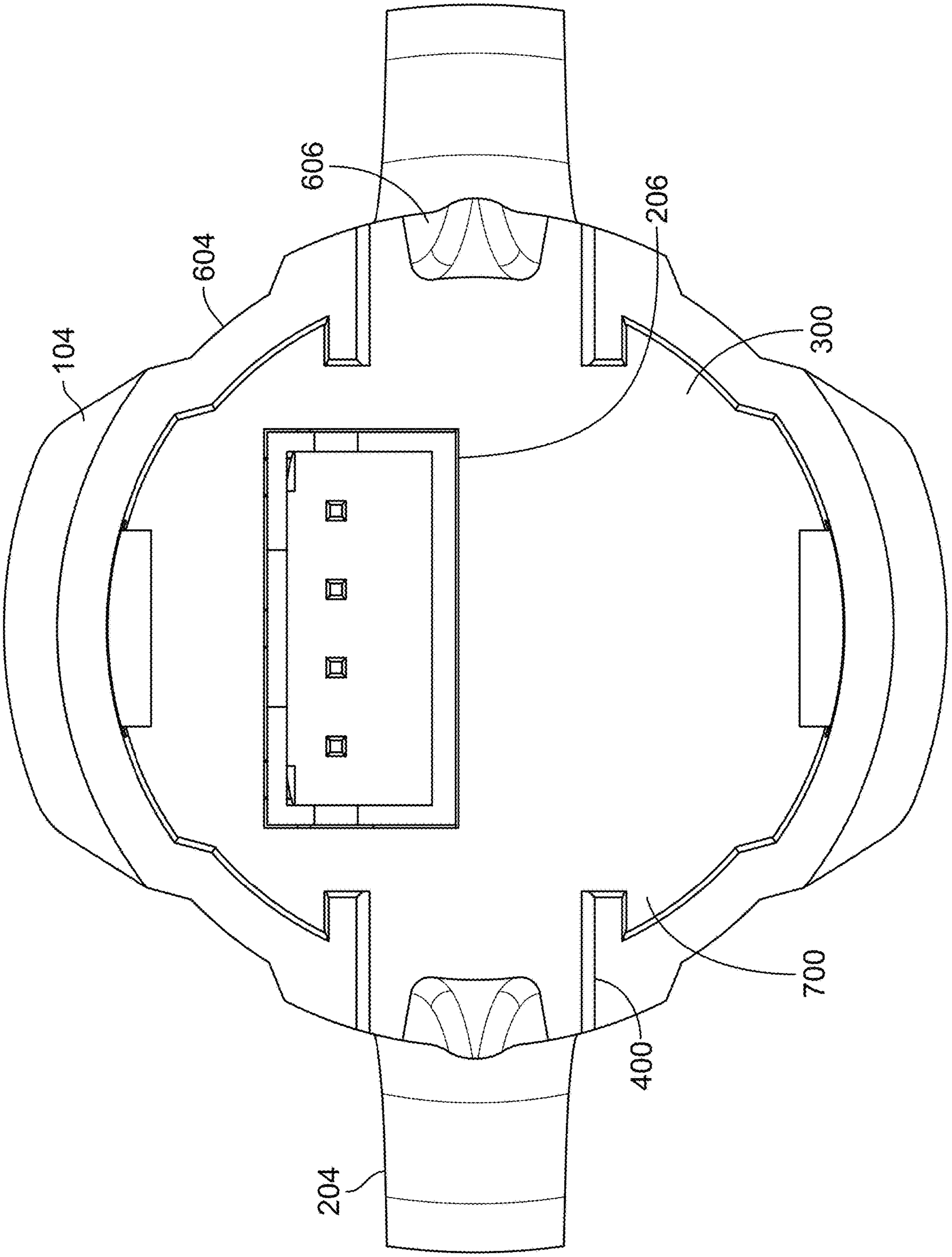
FIG. 8 shows schematically illustrative apparatus in accordance with the principles of the invention.

FIG. 8 shows profiles of inner catches (including inner catch 204) and outer catches (including outer catch 104), as well as split barrel 604 and core 300.

Figure 9:
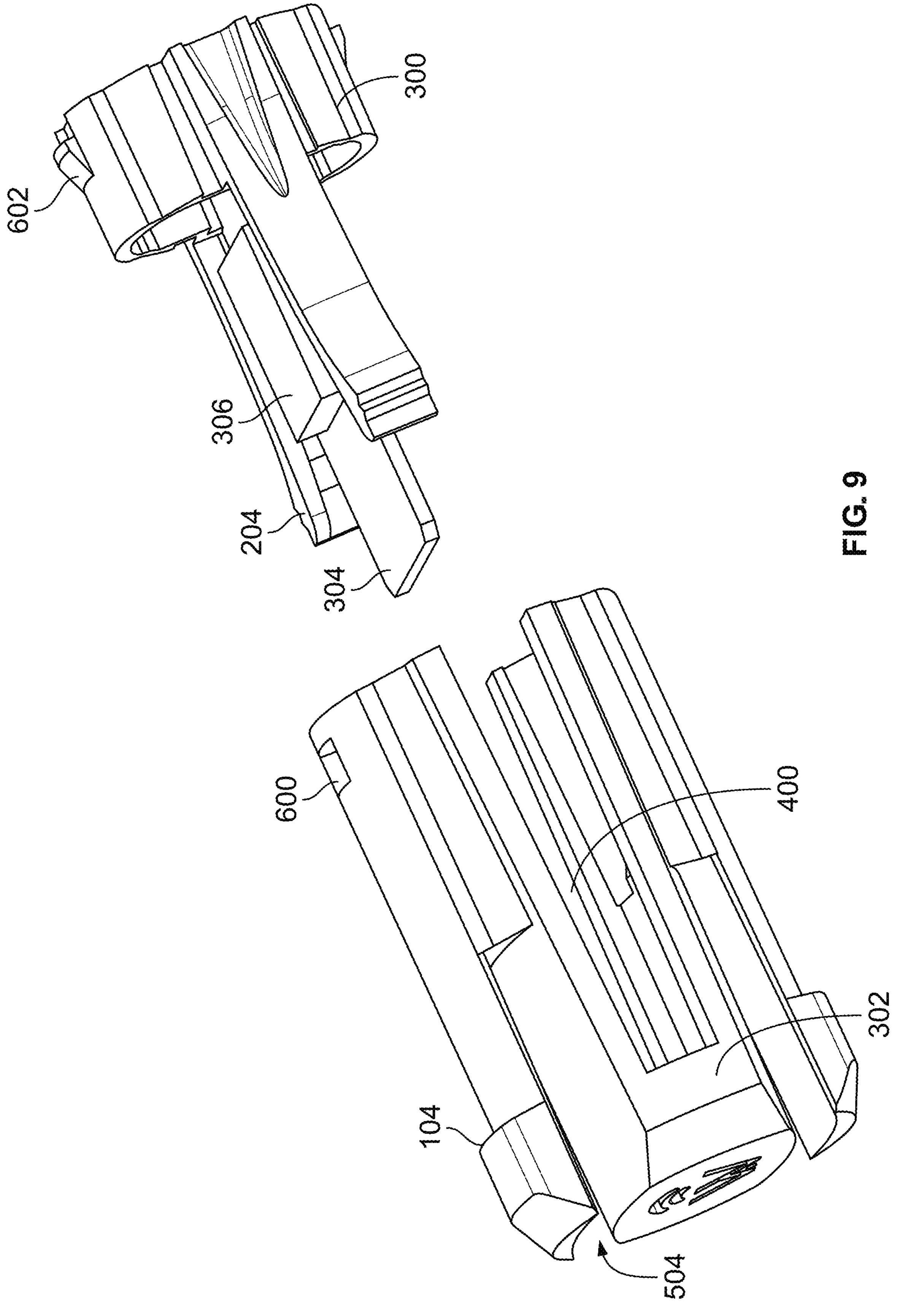
FIG. 9 shows schematically illustrative apparatus in accordance with the principles of the invention.

FIG. 9 shows circuit board 304 detached from main body 302 and attached to core 300. Circuit board 304 being attached to core 300 may include being supported by or otherwise engaged with core 300.

Figure 10:
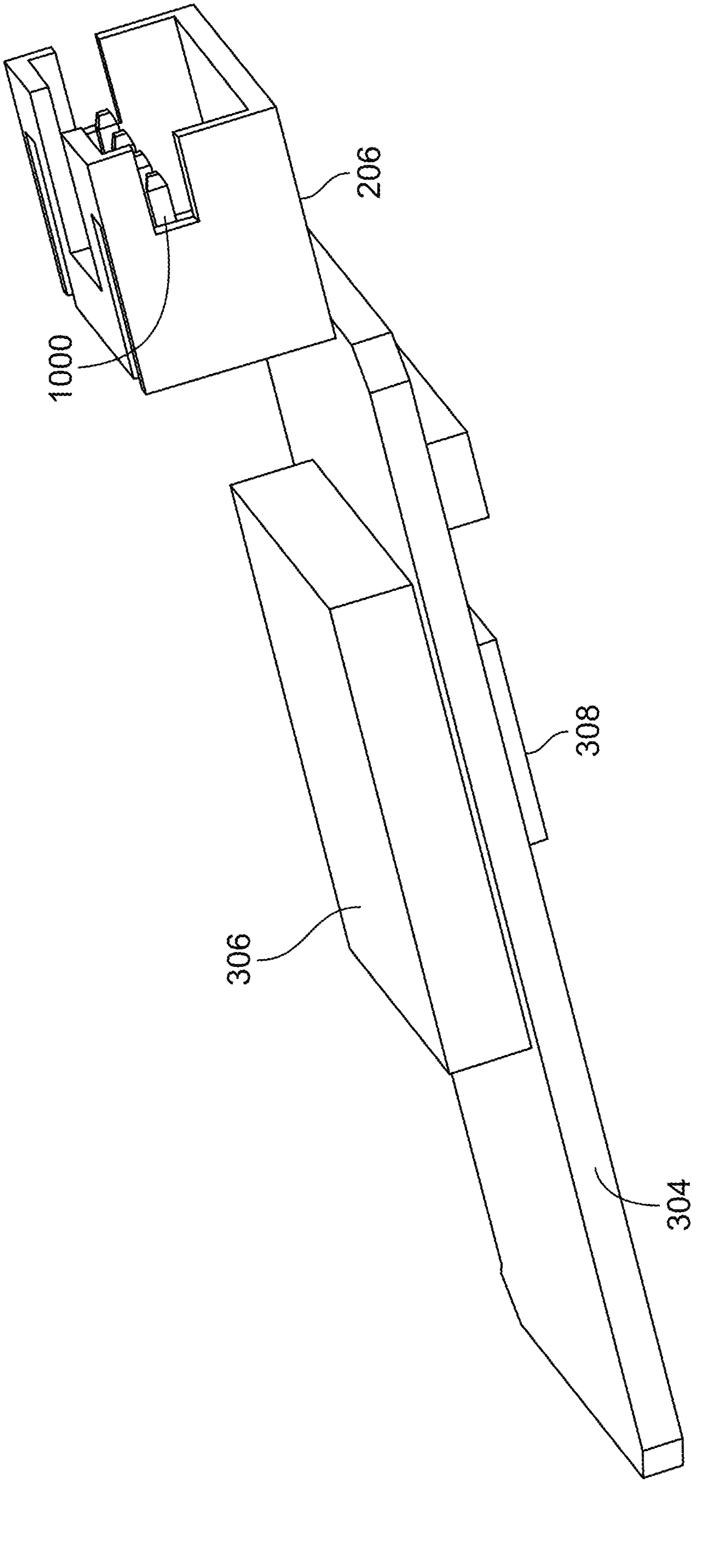
FIG. 10 shows schematically illustrative apparatus in accordance with the principles of the invention.

FIG. 10 shows the circuit board detached from main body 302 and core 300. Pins 1000 may be part of power/comm port 206.

Figure 11:
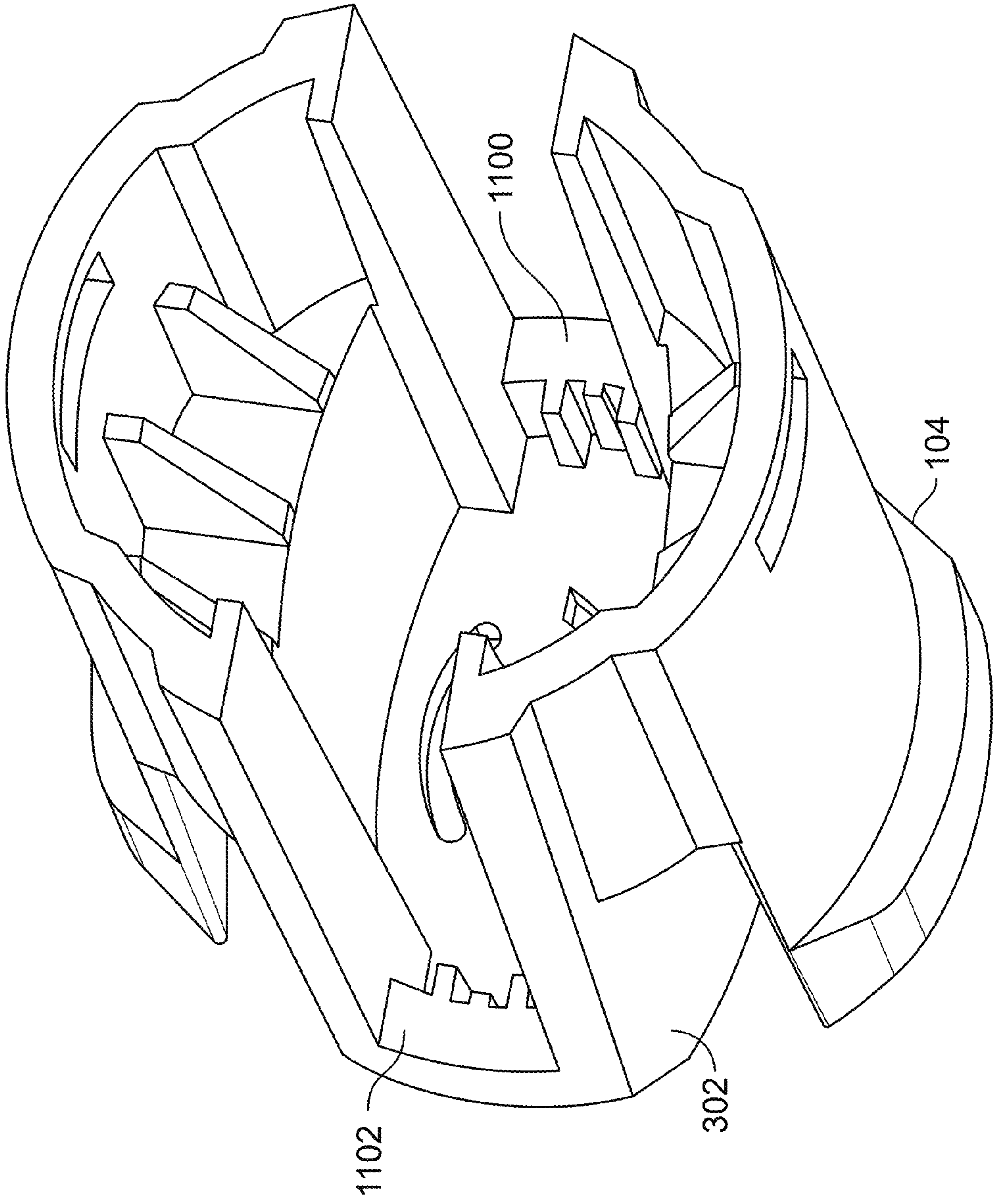
FIG. 11 shows schematically illustrative apparatus in accordance with the principles of the invention.

FIG. 11 shows circuit board receptacles 1100 and 1102 in main body 302. The circuit board receptacles (also referred to elsewhere herein as payload supports) may include notches configured to receive and support a payload such as circuit board 304 in main body 302.

Figure 12:
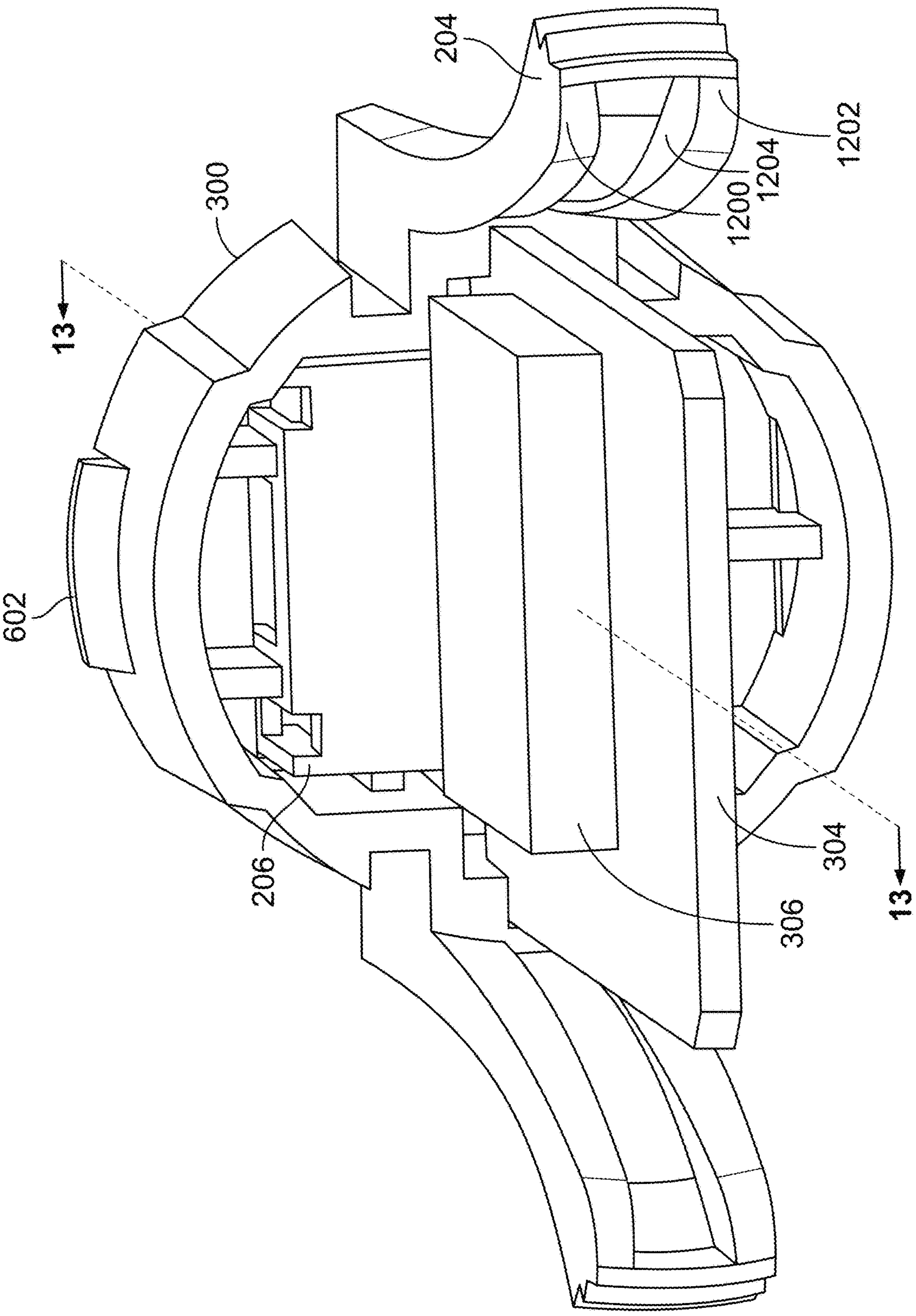
FIG. 12 shows schematically illustrative apparatus in accordance with the principles of the invention.

FIG. 12 shows circuit board 304 attached to core 300. Circuit board 304 may be supported by receptacles similar to, and positioned opposite from, circuit board receptacles 1100 and 1102 in main body 302.

The inner catches (including inner catch 204) may include one or more ribs (1200 and 1202). The inner catches may include one or more webs (1204) between the ribs. The ribs may form a recess that provides clearance with respect to circuit board 304 even when the inner catches are depressed. The ribs may provide stiffness to the inner catches.

Figure 13:
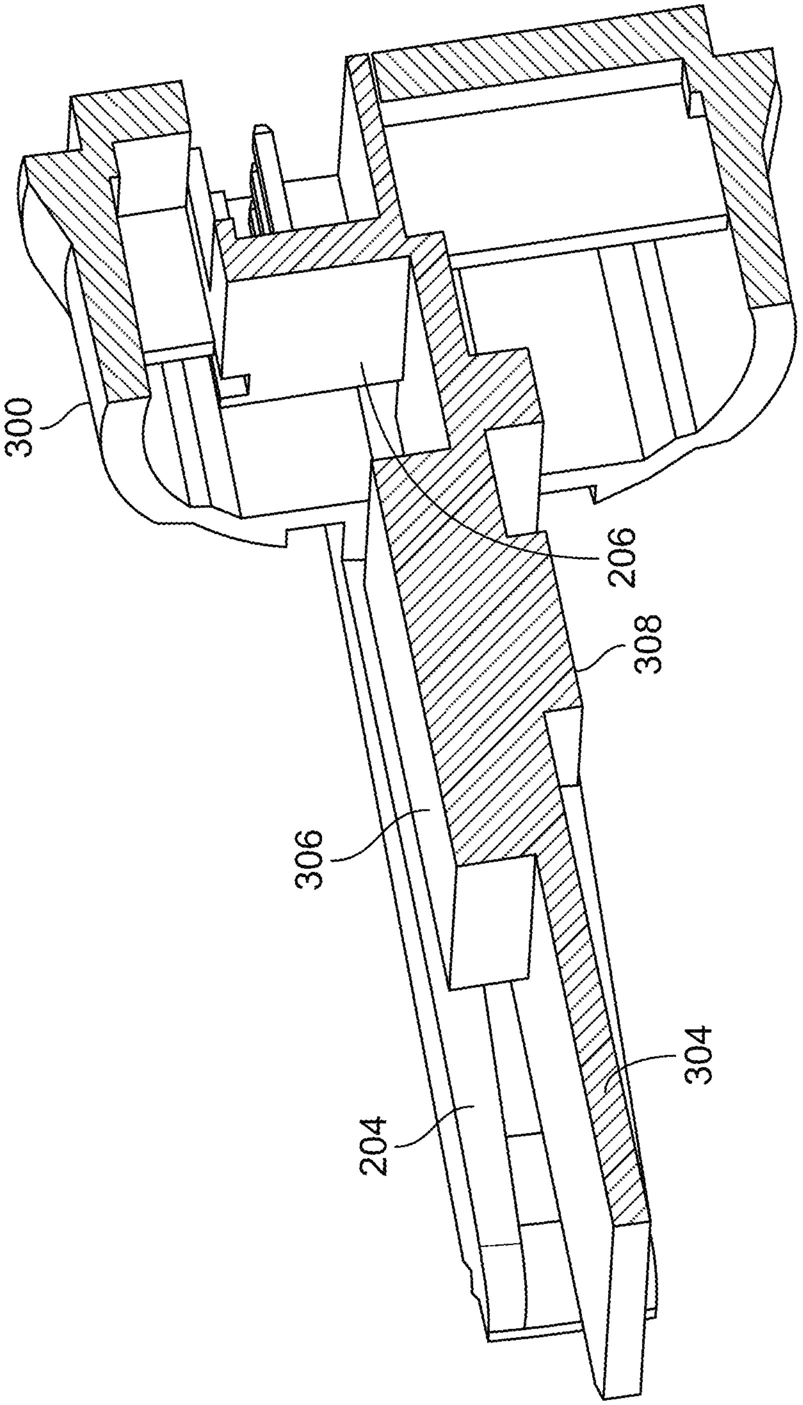
FIG. 13 is a partial cross-section taken along view lines 13-13 (shown in FIG. 12).

FIG. 13 shows a cross section of circuit board 304 attached to core 300.

Figure 14:
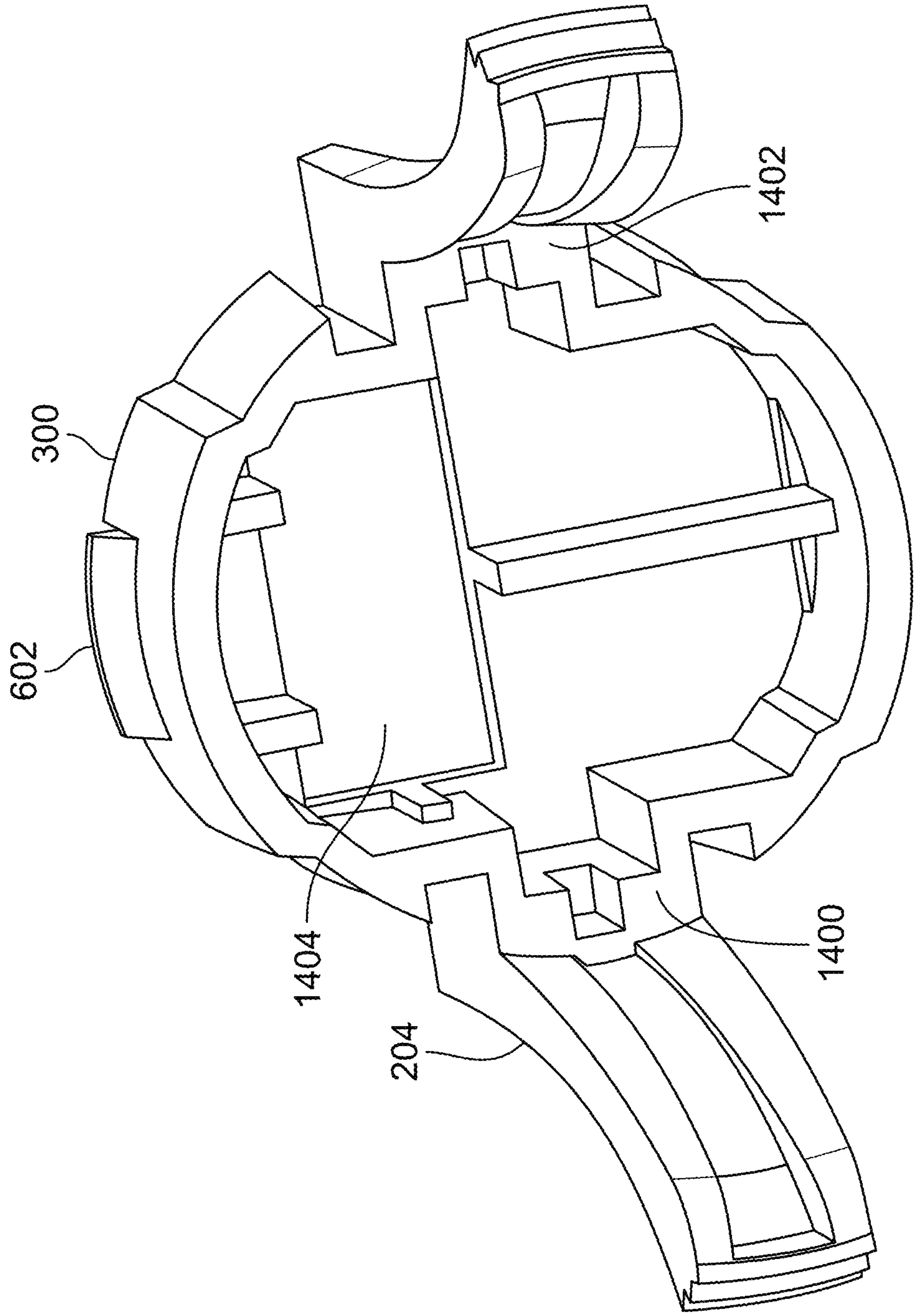
FIG. 14 shows schematically illustrative apparatus in accordance with the principles of the invention.

FIG. 14 shows circuit board receptacles 1400 and 1402 in core 300. The circuit board receptacles may include notches configured to receive and support a payload such as circuit board 304 in core 300, as shown in FIG. 12.

Figure 15:
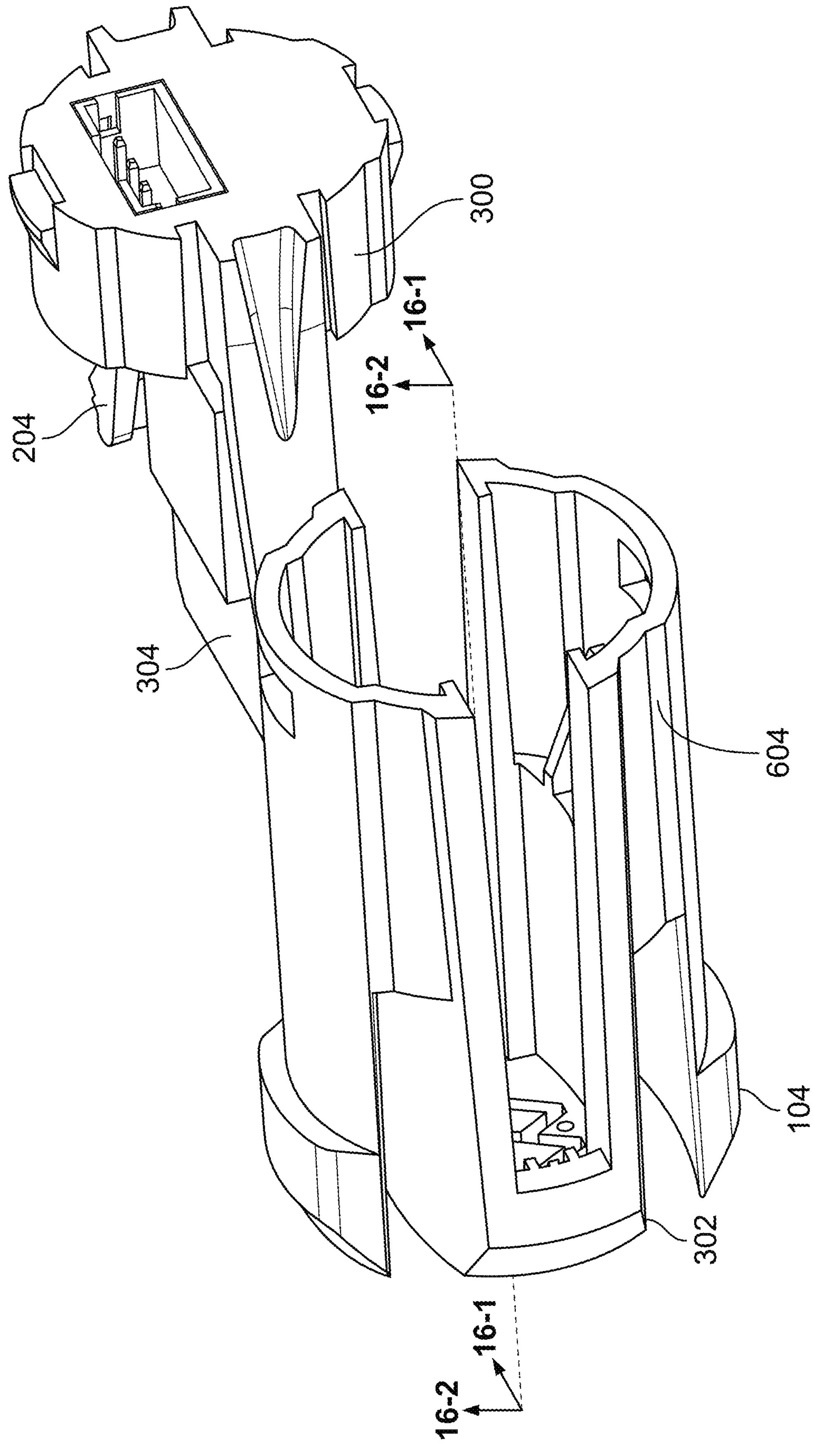
FIG. 15 shows schematically illustrative apparatus in accordance with the principles of the invention.

FIG. 15 shows main body 302 separated from core 300. Circuit board 304 is shown attached to core 300.

Figure 16:
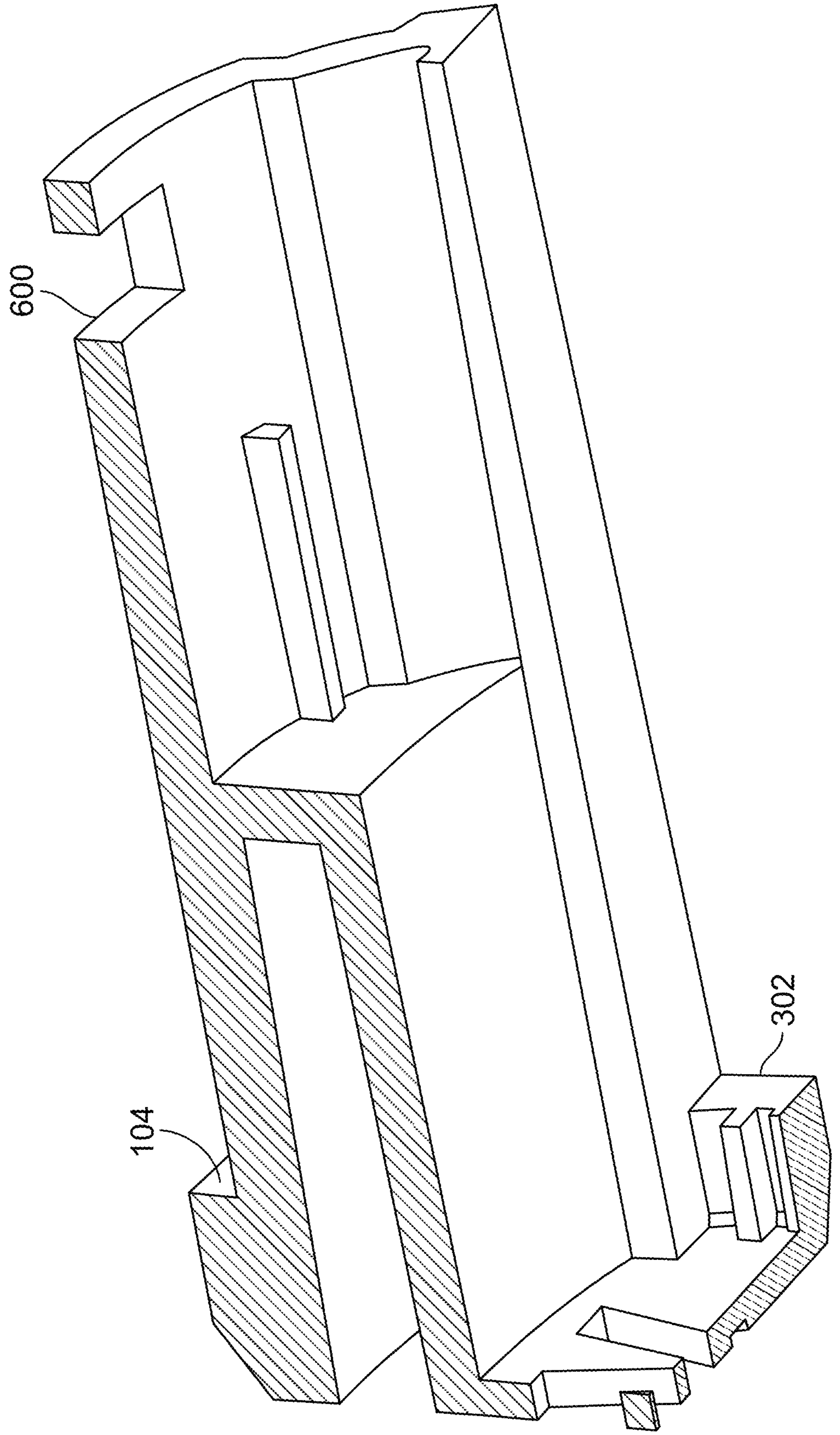
FIG. 16 is a double partial cross-section taken along view lines 16-1-16-1 and 16-2-16-2 (shown in FIG. 15).

FIG. 16 shows main body 302 in a two-plane cross-section. Main body 302 may include outer catches (including outer catch 104) and notch 600.

Figure 17:
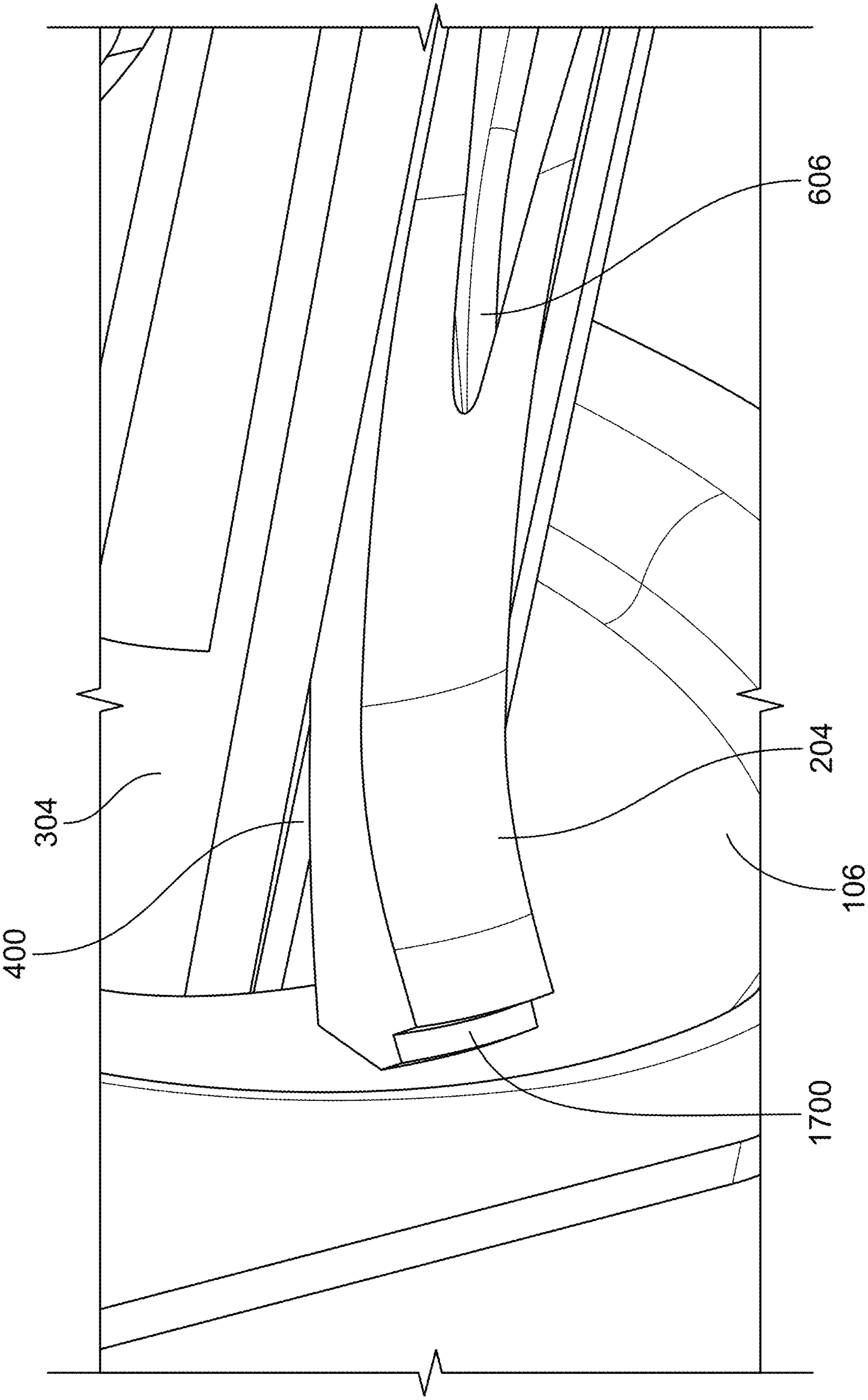
FIG. 17 shows schematically illustrative apparatus in accordance with the principles of the invention.

FIG. 17 shows foot 1700 of inner catch 204. Foot 1700 may be a detent that is urged against mounting structure 106 by bias in inner catch 204. Foot 1700 may include a surface perpendicular to a central axis of mounting adapter 102. The surface may lie against a plate of mounting structure 106. The surface may prevent motion of inner catch 204 towards the outside of mounting structure 106.

Figure 18:
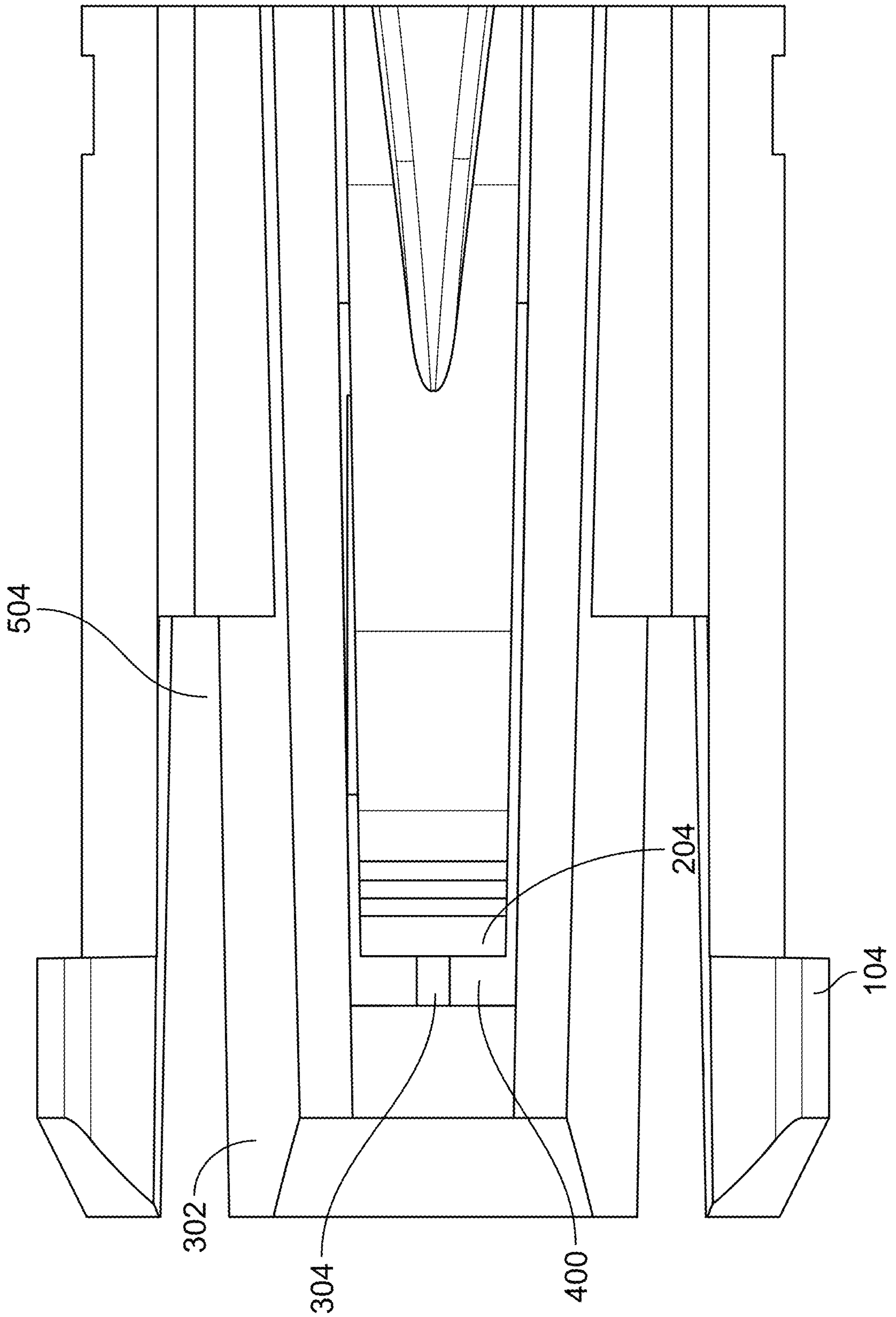
FIG. 18 shows schematically illustrative apparatus in accordance with the principles of the invention.

FIG. 18 shows slot 400 in main body 302 that may provide clearance for deflection of inner catch 204 when inner catch 204 is deflected for insertion of mounting adapter 102 into mounting structure 106 from outside mounting structure 106. Slot 400 may provide clearance for receiving a hinged portion of inner catch 204 when core 300 is inserted into main body 302.

Figure 19:
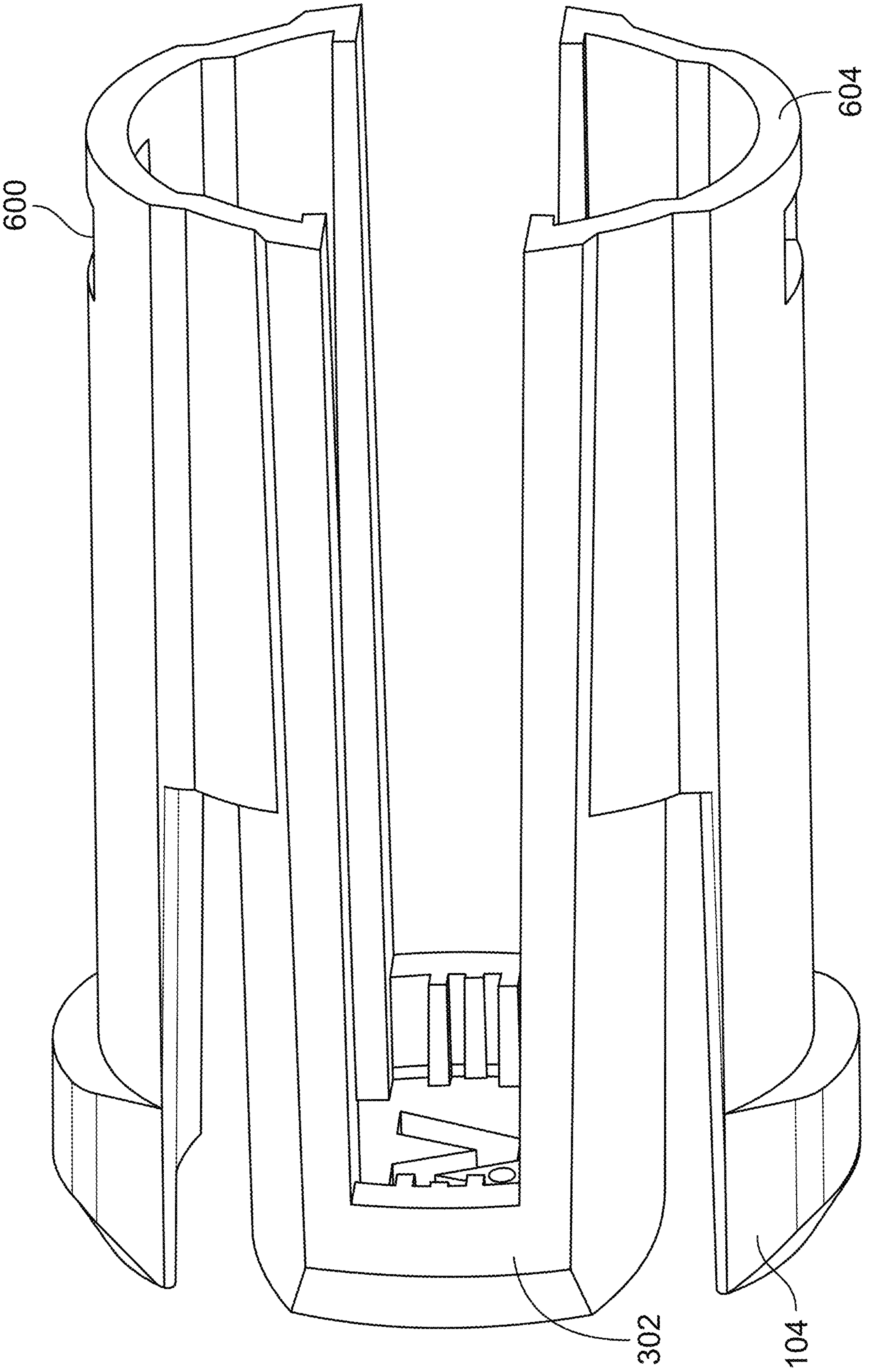
FIG. 19 shows schematically illustrative apparatus in accordance with the principles of the invention.

FIG. 19 shows split barrel 604. The legs or sides of split barrel 604 may be deflected away from axis L1 to accommodate tab 602 of core 300 (not shown in FIG. 19) when core 300 is inserted into split barrel 604. The legs may return to their normal position after tab 602 inserts into notch 600. Split barrel 604 may be a transition section between a main portion of main body 302 (also referred to as the shell) and outer catch 104.

FIG. 19 also shows notch 600 and a diametrically opposed duplicate notch.

Figure 20:
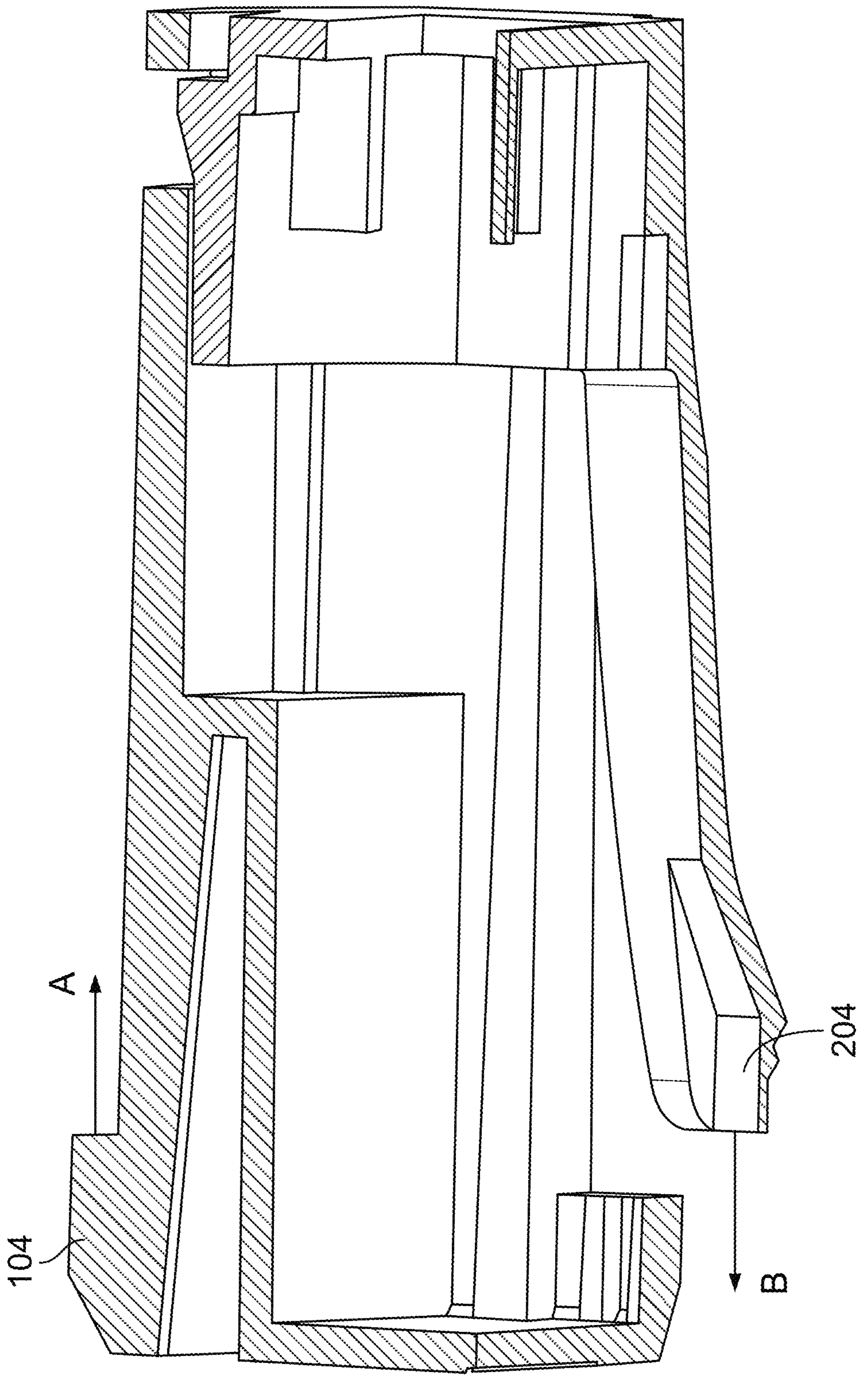
FIG. 20 is a double partial cross-section taken along view lines 20-1-20-1 and 20-2-20-2 (shown in FIG. 6).

FIG. 20 shows direction A, movement along which outer catch 104 is configured to prevent (also referred to as the −L1 direction or the first catch-direction). FIG. 20 shows direction B, movement along which inner catch 204 is configured to prevent (also referred to as the L1 direction or the second catch-direction).

Figure 21:
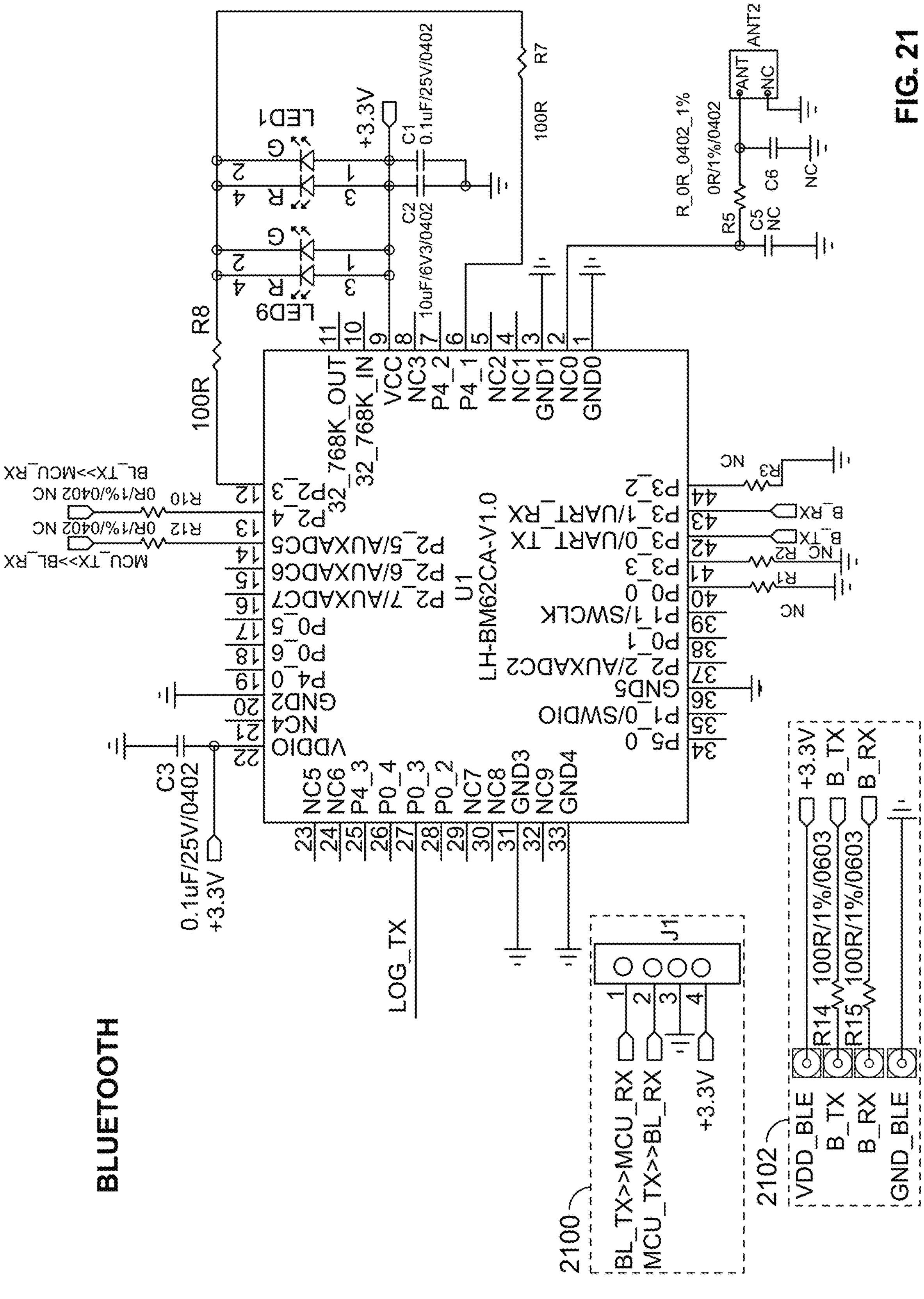
FIG. 21 shows schematically illustrative apparatus in accordance with the principles of the invention.

FIG. 21 shows a circuit diagram. The circuit diagram may be illustrative of aspects of circuitry components 306 and 308, as well as other circuitry components, housed on circuit board 304. The circuit diagram may include circuitry that corresponds to a Bluetooth chip. The Bluetooth chip may include Bluetooth module LH-BM62CA-V1 listed in Table 1. Numbers shown above lines (e.g., numbers 1-44 around the perimeter of the box in the center of FIG. 21) may correspond to pin numbers in the circuit.

A signal may be received via an antenna (e.g., "ANT2" at bottom right). ANT2 may be the only antenna in the system. Alternatively, there may be additional antennae in the system.

The signal may be a Bluetooth signal. The signal may be an RF signal. The signal may be a WiFi signal. The signal may originate from a remote control. The signal may originate from a smart phone. The signal may originate from a router. The router may have received instructions from a remote network. The router may have received instructions from the Internet. The router may, for example, receive instructions from a remote server over the Internet and relay the instructions to the antenna via a WiFi or Bluetooth signal.

The signal may include a command for fixture 108. For example, in an embodiment in which fixture 108 includes an LED light, the command may include a color selection, color intensity, ON/OFF, blink, or any suitable command for fixture 108.

The signal may be relayed to pin 2 of the circuit. An MCU in the circuit may decode the signal. The decoded signal may be relayed out through pin 14 (MCU_TX>>BL_RX) which may be connected to pin 2 of connector 2100. Connector 2100 may be a four-pin connector. The four pins may include two power pins and two communication pins. Connector 2100 may correspond to power/comm port 206 shown in FIG. 2. Fixture 108 may be connected to connector 2100. An LED driver in fixture 108 may receive the signal via connector 2100. The LED driver may interpret the command contained in the signal, and may execute the command. The LED driver may generate a return signal (e.g., an acknowledgement, a status, success/fail, or other suitable message) which may be transmitted back through pin 1 of connector 2100 and into the MCU via pin 13 (BL_TX>>MCU_RX). The MCU may process the return signal and may relay the return signal out via an antenna (e.g., ANT2).

The Bluetooth chip may include one or more LED indicators (e.g., LED1 and LED9 shown at top right of the circuit diagram). The LED indicators may include a red LED light. The LED indicators may include a green LED light. The LED indicators may indicate a status. The LED indicators may indicate a status in accordance with the illustrative mapping set forth in Table 2.

The Bluetooth chip may include circuitry for programming purposes, including pins 42 and 43. Pins 42 and 43 may connect to a programming device (e.g., a computer) via connector 2102.

The programming of the Bluetooth chip may include initial programming or reprogramming, such as at manufacture of the chip. The programming of the Bluetooth chip may include programming or reprogramming after distribution or installation of the chip. In some embodiments, reprogramming the chip may be impossible or impractical, and the chip may be removed and replaced. Mounting adapter 102 may, as described herein, be removable from a fixture housing without removal of the housing from an architectural structure, thereby facilitating easy removal and replacement of the Bluetooth chip.

Apparatus and methods for mounting a payload are thereby provided. Method steps may include designing, preparing, manufacturing, providing, installing, configuring, or otherwise implementing aspects of the described apparatus.

Embodiments may include features that are neither shown nor described in connection with the illustrative apparatus. Features of illustrative apparatus may be combined. For example, an illustrative embodiment may include features shown in connection with another illustrative embodiment. It is to be understood that structural, functional and procedural modifications or omissions may be made without departing from the scope and spirit of the present invention.

As will be appreciated by one of skill in the art, apparatus and methods shown or described herein may be embodied in whole or in part as a method, a data processing system, or a computer program product. Accordingly, such apparatus may take the form of, and such methods may be performed by, an entirely hardware embodiment, an entirely software embodiment or an embodiment combining software, hardware and any other suitable approach or apparatus.

Apparatus and methods may involve the use of any suitable combination of elements, components, or method steps disclosed herein. Embodiments may include features that are neither shown nor described in connection with the illustrative apparatus. Features of illustrative apparatus may be combined. For example, an illustrative embodiment may include features shown in connection with another illustrative embodiment. It is to be understood that structural, functional, and procedural modifications or omissions may be made without departing from the scope and spirit of the present invention.

One of ordinary skill in the art will appreciate that the steps shown and described herein may be performed in other than the recited order and that one or more steps illustrated may be optional.

Thus, apparatus and methods for mounting an accessory have been provided. Persons skilled in the art will appreciate that the present invention may be practiced by other than the described embodiments, which are presented for purposes of illustration rather than of limitation.

What is claimed is:

1. A mounting adapter comprising:

a first releasable catch defining a first direction, movement along which the first releasable catch is configured to prevent;

a second releasable catch defining a second direction, movement along which the second releasable catch is configured to prevent, the second catch-direction being opposite the first catch-direction; and a payload support configured to support a payload;

wherein:

the first releasable catch and the second releasable catch are configured to releasably fix the payload support relative to a mounting hole after the mounting adapter is inserted along the second catch-direction into the mounting hole; and the first releasable catch and the second releasable catch are configured to releasably fix the payload support relative to the mounting hole after the mounting adapter is inserted along the first catch-direction into the mounting hole.

2. The mounting adapter of claim 1 wherein:

the first releasable catch includes a first hinged end and a first free end;

the second releasable catch includes a second hinged end and a second free end; and the first free end and the second free end are disposed, relative to the first hinged end and the second hinged end, respectively, in the second catch-direction.

3. The mounting adapter of claim 1 further comprising a shell defining a window;

wherein:

the payload support is configured to support the payload in the shell; and the window is configured to receive the second releasable catch when the second releasable catch is in a deflected state.

4. The mounting adapter of claim 3 wherein the first releasable catch extends from an exterior of the shell.

5. The mounting adapter of claim 1 further comprising a shell wherein the first releasable catch extends from an exterior of the shell.

6. The mounting adapter of claim 5 wherein the first releasable catch includes a free end that is, when the first releasable catch is in a relaxed state, spaced apart from the exterior of the shell.

7. The mounting adapter of claim 5 wherein the payload support is configured to support the payload in the shell.

8. The mounting adapter of claim 7 wherein;

the shell defines a window; and the window is configured to receive the second releasable catch when the second releasable catch is in a deflected state.

9. The mounting adapter of claim 1 wherein:

the first releasable catch is one of two diametrically opposed first releasable catches; and the second releasable catch is one of two diametrically opposed second releasable catches.

10. The mounting adapter of claim 9 wherein:
the four releasable catches are spaced ninety degrees apart from each other about the mounting adapter.

11. The mounting adapter of claim 1 wherein:
the first releasable catch includes:
a detent that is configured to prevent movement, relative to the mounting hole, of the first releasable catch in the first catch-direction; and
a biased arm that supports the detent and is biased away from a central axis of the mounting adapter.

12. The mounting adapter of claim 1 wherein:
the second releasable catch includes:
a detent that is configured to prevent movement, relative to the mounting hole, of the second releasable catch in the second catch-direction; and
a biased arm that supports the detent and is biased away from a central axis of the mounting adapter.

13. The mounting adapter of claim 1 wherein:
the first releasable catch is included in a plurality of first releasable catches, each configured to prevent movement in the first catch-direction; and
the second releasable catch is included in a plurality of second releasable catches, each configured to prevent movement in the second catch-direction.

14. The mounting adapter of claim 1 further comprising a first base that supports the first releasable catch.

15. The mounting adapter of claim 14 further comprising a second base that supports the second releasable catch.

16. The mounting adapter of claim 15 wherein the first base further comprises a shell that:
extends from an outer cap of the first base; and
is configured to receive the second base.

17. The mounting adapter of claim 16 wherein, in operation:
the first base and the second base form a frame in which the payload support is configured to hold the payload.

18. The mounting adapter of claim 17 wherein the frame defines windows for clearance of the second releasable catch.

19. The mounting adapter of claim 15 wherein the first base supports the first releasable catch via a first biased hinge.

20. The mounting adapter of claim 19 wherein the second base supports the second releasable catch via a second biased hinge.

21. The mounting adapter of claim 20 wherein the second biased hinge includes a second flexural hinge.

22. The mounting adapter of claim 21 wherein the second releasable catch includes a second free end that is configured to move by flexion of the second flexural hinge.

23. The mounting adapter of claim 19 wherein the first biased hinge includes a first flexural hinge.

24. The mounting adapter of claim 23 wherein the first releasable catch includes a first free end that is configured to move by flexion of the first flexural hinge.

25. The mounting adapter of claim 15 wherein the payload support is disposed in the first base.

26. The mounting adapter of claim 25 wherein the payload support includes one or more notches defined by the first base.

27. The mounting adapter of claim 15 wherein the first and second bases together define the payload support.

28. The mounting adapter of claim 27 wherein the payload support includes one or more notches defined by the first base and one or more notches defined by the second base.

29. The mounting adapter of claim 1 wherein the payload includes an antenna.

30. The mounting adapter of claim 1 wherein the payload includes a microcontroller.

* * * * *